United States Patent [19]
Yanai et al.

[11] Patent Number: 5,680,175
[45] Date of Patent: Oct. 21, 1997

[54] VIDEO SIGNAL CONVERSION APPARATUS HAVING A COMMON FRAME MEMORY FOR VIDEO SIGNALS HAVING DIFFERENT SYNCHRONIZING SIGNALS

[75] Inventors: Norifumi Yanai, Ibaraki-ken; Ryo Fujita, Hitachi; Koyo Katsura, Hitachiota; Yasushi Fukunaga, Hitachi, all of Japan

[73] Assignee: Hitachi, Ltd., Tokyo, Japan

[21] Appl. No.: 513,022

[22] Filed: Aug. 9, 1995

Related U.S. Application Data

[62] Division of Ser. No. 945,937, Sep. 17, 1992, Pat. No. 5,519,449.

[30] Foreign Application Priority Data

Sep. 17, 1991 [JP] Japan .................................. 3-235925
Mar. 3, 1992 [JP] Japan .................................... 4-45775

[51] Int. Cl.⁶ ...................................................... H04N 7/01
[52] U.S. Cl. .......................... 348/441; 348/714; 348/759; 348/598

[58] Field of Search ........................... 348/715, 441, 348/448, 458, 459, 714, 716, 717, 718, 598, 719, 580, 720, 524, 721

[56] References Cited

U.S. PATENT DOCUMENTS 4,485,402  11/1984  Searby ................................... 349/715

*Primary Examiner*—John K. Peng
*Assistant Examiner*—Nathan J. Flynn
*Attorney, Agent, or Firm*—Antonelli, Terry, Stout & Kraus, LLP.

[57] ABSTRACT

An image composing and displaying apparatus includes frame memory constituent elements of an identical structure, a video input portion, a video output portion, a controller for selecting connection of each element to the video input or output portion, and an image drawing portion for reading and writing video data from and in the memory elements. The memory elements can be used for the input and output operations and hence the size thereof can be easily expanded; moreover, the numbers of the elements respectively connected to the video input and output portions can be adaptively varied.

3 Claims, 25 Drawing Sheets

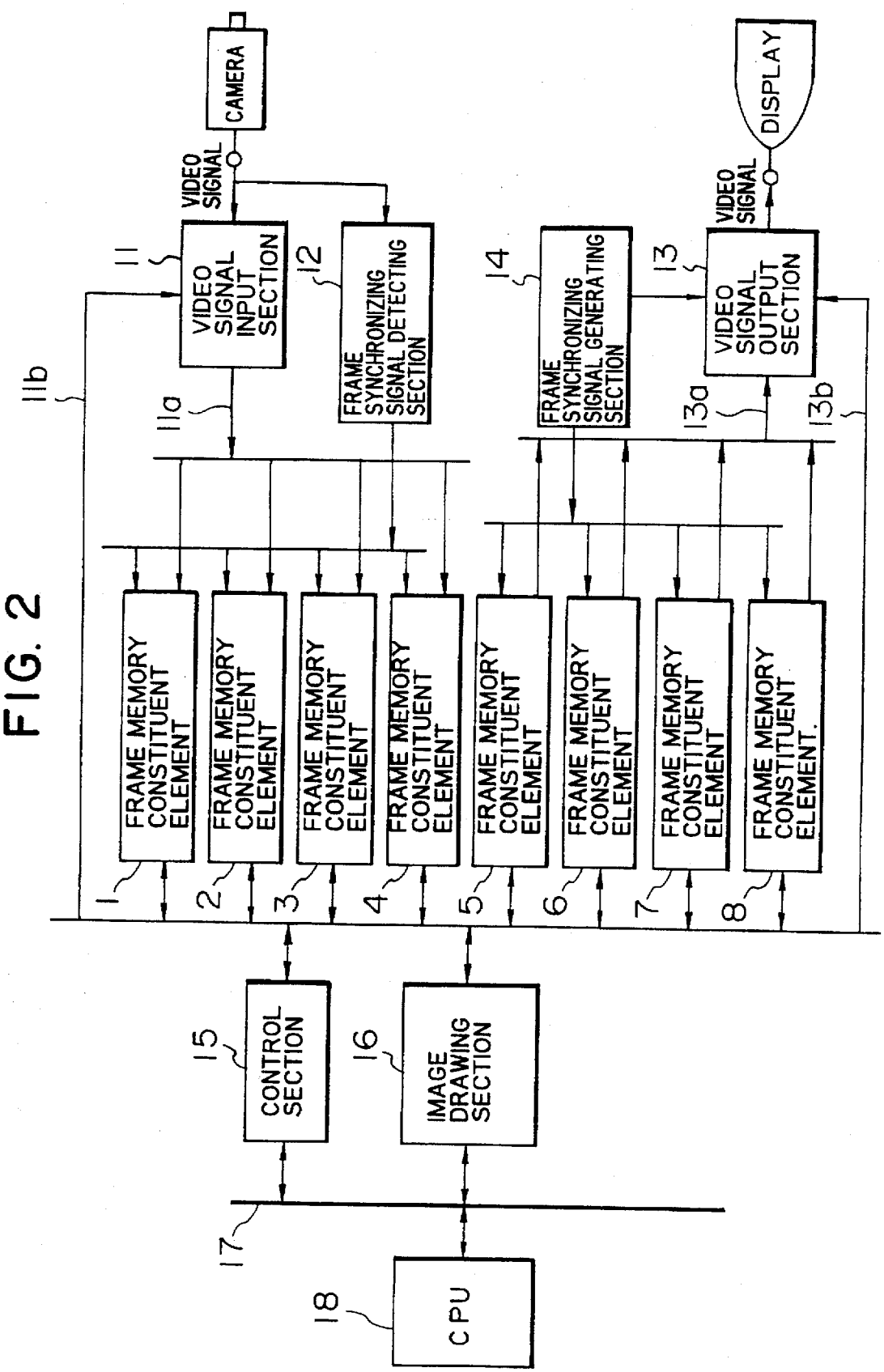

FIG. 3

| MEMORY ADDRES | |
|---|---|
| 0 | FRAME MEMORY CONSTITUENT ELEMENT ON INPUT SIDE |
| n | FRAME MEMORY CONSTITUENT ELEMENT ON INPUT SIDE |
| 2n | FRAME MEMORY CONSTITUENT ELEMENT ON INPUT SIDE |
| 3n | FRAME MEMORY CONSTITUENT ELEMENT ON INPUT SIDE |
| 4n | FRAME MEMORY CONSTITUENT ELEMENT ON OUTPUT SIDE |
| 5n | FRAME MEMORY CONSTITUENT ELEMENT ON OUTPUT SIDE |
| 6n | FRAME MEMORY CONSTITUENT ELEMENT ON OUTPUT SIDE |
| 7n 8n-1 | FRAME MEMORY CONSTITUENT ELEMENT ON OUTPUT SIDE |

FIG. 4

START
↓
WRITE VIDEO SIGNALS FROM VIDEO INPUT SECTION IN ELEMENT CONNECTED TO VIDEO INPUT SECTION ~501
↓
READ VIDEO SIGNALS FROM ELEMENT ~502
↓
ACHIEVE TEXTURE MAPPING FOR VIDEO SIGNALS ~503
↓
WRITE 3-DIMENSIONAL GRAPHIC IMAGE IN ELEMENT CONNECTED TO VIDEO OUTPUT SECTION ~504
↓
WRITE MAPPED VIDEO SIGNALS IN ELEMENT CONNECTED TO VIDEO OUTPUT SECTION ~505
↓
END

| BUFFER  ELEMENT No. | INPUT BUFFER ||||| OUTPUT BUFFER ||||| PRESENCE / ABSENCE OF INTERLEAVING |
|---|---|---|---|---|---|---|---|---|---|---|---|
| | SINGLE | DOUBLE || TRIPLE ||| SINGLE | DOUBLE || TRIPLE ||| |
| | | a | b | a | b | c | | a | b | a | b | c | |
| 1 | | O | | | | | | | | | | | ABSENCE |
| 2 | | O | | | | | | | | | | | ABSENCE |
| 3 | | | O | | | | | | | | | | ABSENCE |
| 4 | | | O | | | | | | | | | | ABSENCE |
| 5 | | | | | | | | O | | | | | PRESENCE |
| 6 | | | | | | | | O | | | | | PRESENCE |
| 7 | | | | | | | | | O | | | | PRESENCE |
| 8 | | | | | | | | | O | | | | PRESENCE |

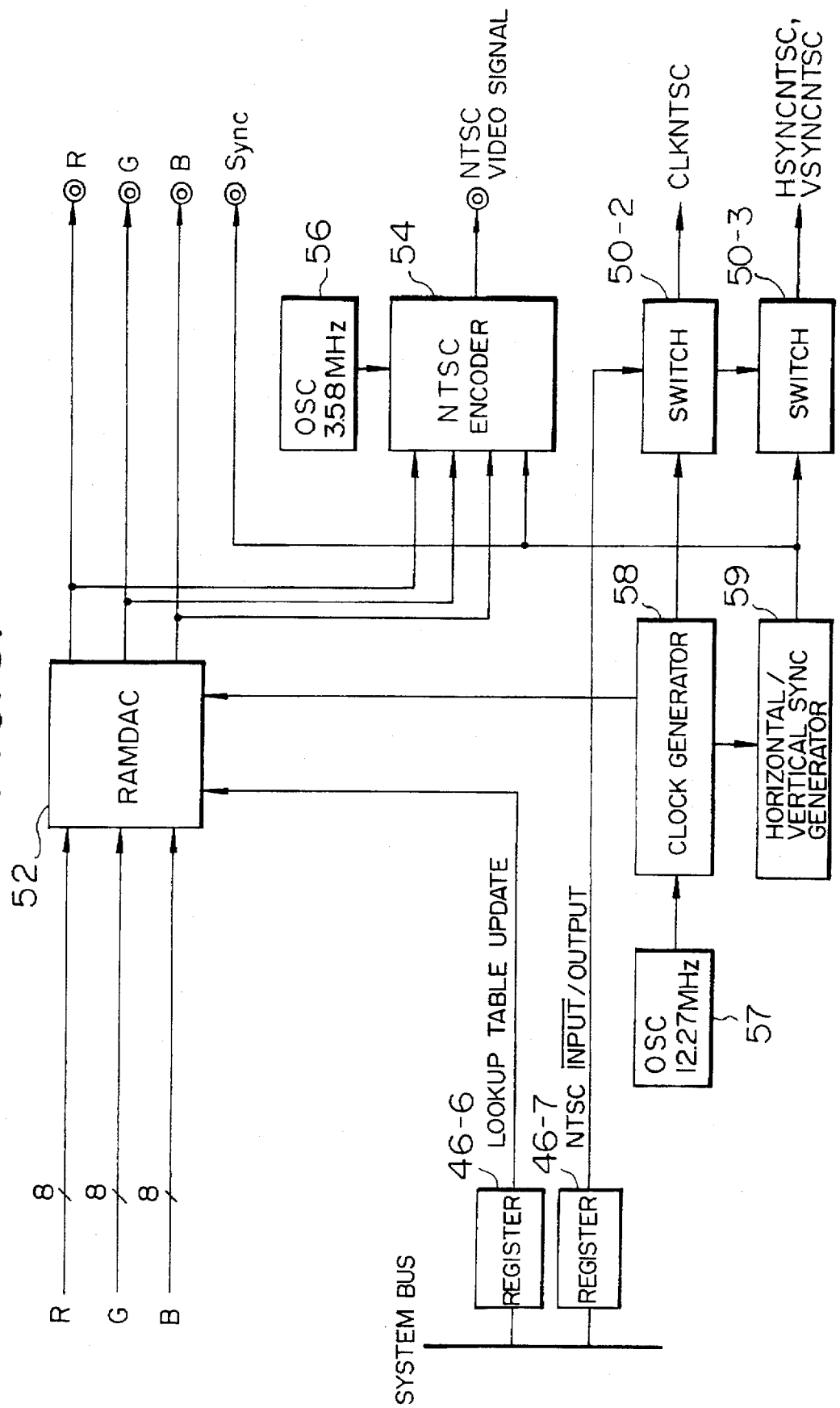

VIDEO SIGNAL CONVERSION APPARATUS HAVING A COMMON FRAME MEMORY FOR VIDEO SIGNALS HAVING DIFFERENT SYNCHRONIZING SIGNALS

This application is a Division of application Ser. No. 07/945,937, filed Sep. 17, 1992 now U.S. Pat. No. 5,519,449.

BACKGROUND OF THE INVENTION

The present invention relates to an image composing and displaying apparatus for displaying a composite image in which video signals received from a television camera and/or a video tape recorder are displayed on a display screen presenting computer graphics of a workstation or the like.

By combining computer graphics with video signals to display a composite image on a screen according to a super-imposing technology and a multi-window system, there can be obtained results applicable to a workstation which can be used in a multi-media presentation system and a remote electronic conference.

Heretofore, as described in the JP-A-2-222029, the system includes a video input section for inputting a video signal and converting the signal into digital image data, a first frame memory for storing therein the digital image data output from the video input section, a second frame memory for storing therein a signal output from the first frame memory or a still picture, a video signal output section for converting an output from the second frame memory into a video signal and outputting therefrom the video signal, a signal bus for inputting a still image to the second memory, and a central processing unit (CPU) for controlling the operation of writing the output from the first frame memory or the still picture in the second frame memory.

In the constitution set forth above, the input video signal is stored in the first frame memory such that stored image data is transferred to the second frame memory at a sufficiently high speed to guarantee a period of time for the CPU to write the still picture in the second frame memory.

According to the prior art above, the first and second frame memories are employed exclusively for the video signal input and output operations, respectively. Consequently, when a video signal is not displayed on the screen, the input dedicated frame memory is not used at all. Namely, there has not been considered any use thereof for other purposes. For example, the memory may be employed as the output dedicated frame memory.

Furthermore, a conventional example of the JP-A-2-82758 will now be described.

FIG. 27 shows in a block diagram the configuration of the example, which includes raster buffers 200 and 202, a counter 204, a frame memory 206, and a write control section 208.

In the raster buffer 200 or 202, there is input data is written at a timing synchronized with a data clock signal. The buffers 200 and 202 form a double buffer system. A change-over therebetween is activated at a predetermined interval of time according to a count accumulated in the counter 204 counting the data clock signal. While data is being input to one of the buffers, a raster of data, namely, data equivalent to a raster is output from the other buffer to the frame memory 206. The data write operation in the memory 206 is executed in synchronism with a display clock signal. The write control section 208 generates a write request signal WREQ with reference to a horizontal synchronizing signal HD to instruct the output of a raster from the frame memory 206.

FIG. 28 is a signal timing chart of the prior art example.

Input data is stored in the raster buffer 200 or 202 during a plurality of raster periods independently of the display clock signal and the horizontal synchronizing signal HD adopted as reference signals for the operation of the frame memory 206. When reading data from the buffer 200 or 202, the data is written in the frame memory 206, at a timing synchronized with the display clock, during a raster period instructed by the write request signal WREQ. According to the conventional example, data items successively input via a channel can be written entirely in the frame memory even when the data clock signal does not match the display clock signal.

In the prior art, data successively input via a channel can be stored in a frame memory. The consecutive input data includes, for example, video signals.

However, to conduct input and output operations of video signals via two or more channels, there is required other techniques, which have not been considered in the prior art.

SUMMARY OF THE INVENTION

It is therefore a first object of the present invention to provide an apparatus for and a method of composing and displaying an image in which a memory is shared between input and output operations and the size of a frame memory can be easily expanded.

A second object of the present invention to provide an apparatus for and a method of composing and displaying an image in which video signals delivered via two or more channels with different synchronizing signals are simultaneously input and output in and from a frame memory.

In order to achieve the first object according to the present invention, according to a feature of the present invention the image composing apparatus includes a video input section for converting a video signal input thereto into image data, a frame memory comprising a plurality of frame memory constituent elements each having an identical structure, a video output section for outputting image data stored in the frame memory to a display section, a control section for controlling selection to connect each of the plural elements to the video input or output section, a CPU for controlling graphic data, and an image drawing section for developing the graphic data input thereto into pixel data and writing the pixel data in the elements or reading image data from the elements and processing the image data.

According to the configuration of the present invention, connections of the memory elements respectively to the video input and output section are controlled, and the number of the elements to be connected to the video input or output section can be arbitrarily determined. The image drawing section reads image data stored in the elements connected to the video input section and then works thereon to output the resultant image data in the elements connected to the video output section, thereby combining image data and video signals under control of the CPU.

In this connection, the frame memory constituent element indicates each unit of frame memory constituting the overall frame memory.

In order to achieve the second object according to the present invention, the image input/output device for conducting input and output operations of the first and second video signals includes a frame memory for storing therein first data and second data respectively stored in the first and second video signals, a buffer for communicating and storing therein the second data, time indicating means for outputting as a timing signal a blanking period or an effective period of the first video signal, a time-sharing control means operative in response to reception of a request from the buffer for a transfer period in which the second data is communicated between the frame memory and the buffer for outputting a transfer acknowledgment to the buffer, thereby allocating either one of the periods reported from the time indicating means to the transfer period of the second data. The buffer issues the allocation request of the transfer period of the second data to the time-sharing control means and achieves, when the transfer period is thus allocated, a communication of the second data with the frame memory.

In the configuration of the image input/output apparatus, the frame memory stores therein first data and second data respectively stored in the first and second video signals. The buffer is used to communicate and to store therein the second data. The time indicating means outputs, as a timing, signal a blanking period (a horizontal or vertical blanking period) or an effective period (a horizontal or vertical effective period) of the first video signal. The time-sharing control means is operative in response to reception of a request from the buffer for a transfer period for communication between the frame memory and the buffers to output transfer acknowledgment respectively to the buffer, thereby allocating one of the periods reported from the time indicating means to the transfer period of the second data. The buffer issues the allocation request of the transfer period of the second data to the time-sharing control means and achieves, when the transfer period is allocated, a communication of the second data with the frame memory.

BRIEF DESCRIPTION OF THE DRAWINGS

These and other objects and advantages of the present invention will become apparent by reference to the following description and accompanying drawings wherein:

FIG. 2 is a block diagram showing the constitution of an application example according to the present invention;

FIG. 3 is a memory address map of the frame memory constituent elements of FIG. 2;

FIG. 4 is a flowchart useful to explain a method of combining a computer graphic image with video signals;

FIG. 31 is a detailed block diagram showing the signal output section for outputting the NTSC video signal.

DESCRIPTION OF THE PREFERRED EMBODIMENTS

Figure 1:
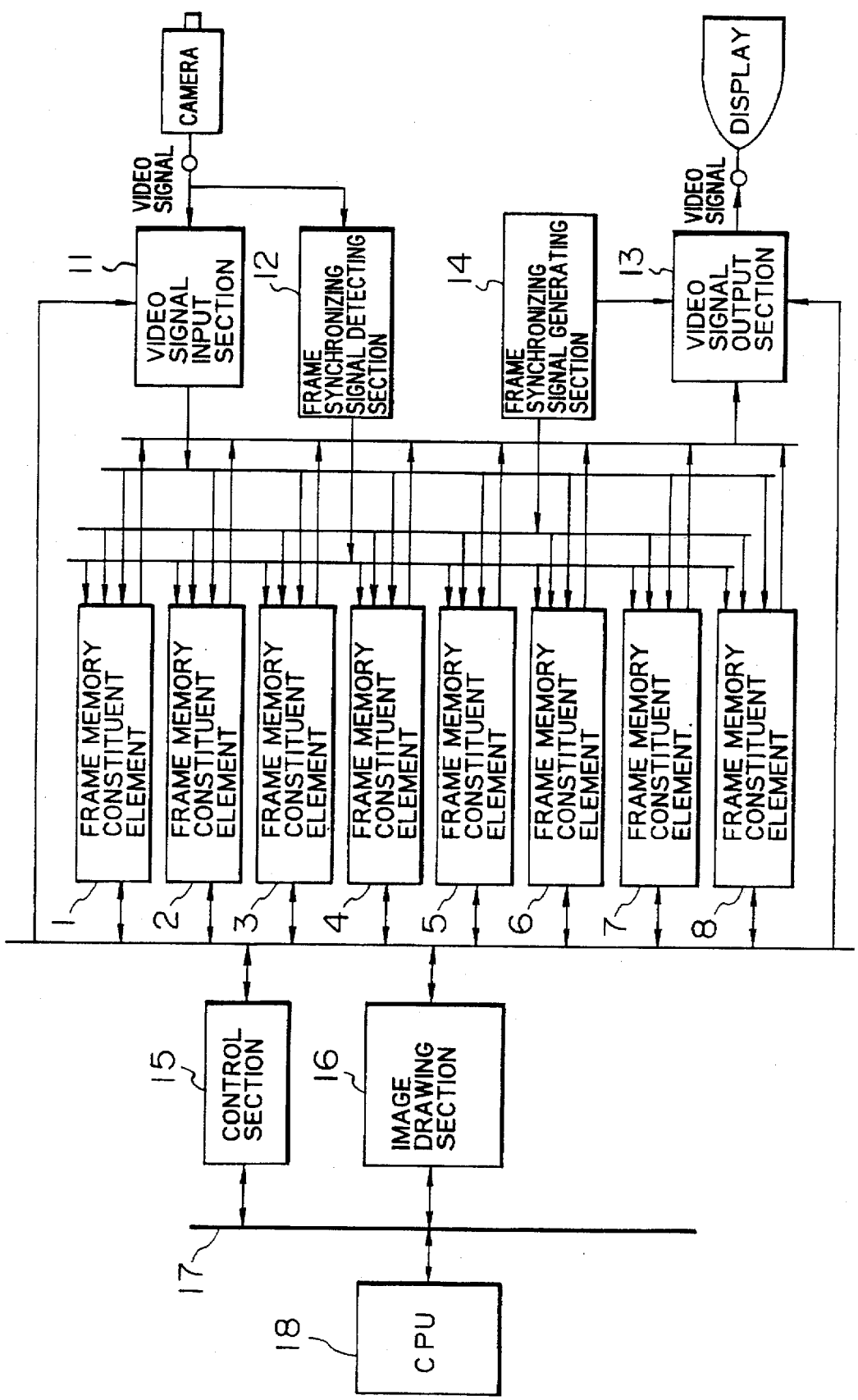
FIG. 1 is a block diagram showing the configuration of a first embodiment according to the present invention.

Referring now to the drawings, description will be given in detail of an embodiment achieving the first object in accordance with the present invention.

FIG. 1 shows in a block diagram the structure of a first embodiment according to the present invention. This system includes frame memory constituent units or elements 1 to 8 each having an identical structure, a video signal input section 11 for converting input video signals into digital image data and outputting the converted data to the elements 1 to 8, a frame synchronizing signal detecting section 12 for detecting a frame synchronizing signal of input video signals and outputting the signals to the elements 1 to 8, a video signal output section 13 for reading data from the elements 1 to 8 to convert the data into video signals, a frame synchronizing signal generating section 14 for generating a frame synchronizing signal for outputting video signals and outputting the result to the elements 1 to 8 and the video signal output section 13, a control section 15 for selectively controlling connections of the elements 1 to 8 to the video signal input section 11 or the video signal output section 13, an image drawing section 16 for developing image or graphic data of the computer graphics received via a signal bus, which will be described later, into pixel data and writing the pixel data in the elements 1 to 8, a signal bus 17 for outputting control information from a CPU, which will be described later, to the control section 15 and delivering graphic data from the CPU to the image drawing section 16, and a CPU 18.

The controller 15 has therein a control table, which will be described later. For the pertinent frame memory constituent element, selection of connection thereof to the video signal input section 11 or the video signal output section 13 is registered to the control table. The image drawing section 16 is allowed to access the elements 1 to 8 at any point in time.

As set forth above, since each element can be selectively connected to the video signal input section 11 or the video signal output section 13, the identical element can be employed for the input and output operations.

Moreover, due to provision of a plurality of frame memory constituent elements having the same structure, the size of the frame memory can be easily expanded. In a case where very fine video signals are to be input to the system, the number of frame memory constituent elements for selective connections to the video signal input section may be increased. On the other hand, when very fine video signals are to be output from the system, the number of frame memory constituent elements for selective connections to the video signal output section may be increased. As set forth above, depending on requirements, the number of elements for selective selections of the video signal input section and the number of elements for selective selections of the video signal output section can be arbitrarily set to desired values, respectively.

FIG. 2 shows in a block diagram the configuration of an application example of the present invention. The same components as those of FIG. 1 are assigned with the same reference numerals. This constitution includes frame memory constituent elements 1 to 8 each having the same construction, a video signal input section 11 for converting input video signals into digital image data and outputting the data via a line 11a to the elements 1 to 8, a frame synchronizing signal detecting section 12 for detecting a frame synchronizing signal of input video signals and outputting the signals to the elements 1 to 8, a video signal output section 13 for reading data from the elements 1 to 8 via a line 13a to convert the data into video signals, a frame synchronizing signal generating section 14 for generating a frame synchronizing signal for output video signals and outputting the result to the elements 1 to 8 and the video signal output section 13, a control section 15 for selectively controlling connections of the elements 1 to 8 to the video signal input section 11 or the video signal output section 13, an image drawing section 16 for developing image or graphic data of the computer graphics received via a signal bus, which will be described later, into pixel data and writing the pixel data in the elements 1 to 8, a signal bus 17 for outputting control information from a CPU, which will be described later, to the control section 15 and delivering graphic data from the CPU to the image drawing section 16, and a CPU 18.

The controller 15 possesses therein a control table, which will be described later. For the pertinent frame memory constituent element, selection of connection to either the video signal input section 11 or the video signal output section 13 is registered to the control table. Moreover, the control section 15 indicates a specification of image data for the video signal input section 11 via the line 11b and a specification of image data for the video signal output section via the line 13b. The image drawing section 16 can access the elements 1 to 8 at any point in time.

As shown in the diagram, the four elements 1 to 4 and the remaining four elements 5 to 8 are selected for connections to the video signal input section 11 and the video signal output section 13, respectively. Description will now be given of an example in which four elements are assigned to each of the input and output sections 11 and 13.

FIG. 3 is a memory address map of the frame memory constituent units 1 to 8 of FIG. 2.

As can be seen from the map, for the access of the image drawing section 16, addresses of the elements are mapped onto a single memory space ranging from address 0 to address 8n−1. Each element is assigned with n addresses. When an element is connected to the input section 11, the n addresses can be used as input addresses for video signals. Conversely, when the element is connected to the output section 13, the n addresses can be used for outputting video signals.

Figures 5, 6:
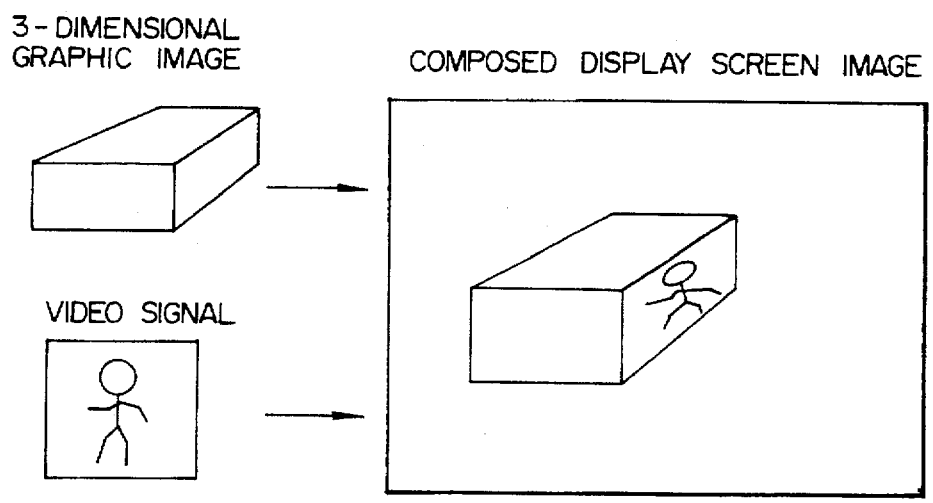
FIG. 5 is a diagram schematically showing a display screen of the composed image resulting from the computer graphic image and the video signals.
FIG. 6 is a control table for supervising connections between the frame memory constituent elements and a video input and output sections.

FIG. 4 is a flowchart useful to explain a method of combining a computer graphic image with video signals. In step 501, video signals are input to be written in the elements 1 to 4 selected for connections to the input section 11. In step 502, the image drawing section 16 reads image data from the elements 1 to 4. In step 503, the attained image data is processed through numerical operations such as a texture mapping. In step 504, the resultant image data is written in the elements 5 to 8 selected for connections to the output section 13. In step 504, the image drawing section 16 writes in the elements 5 to 8 a three-dimensional graphic image on which the image data undergone the numerical operation is to be attached. As a result, the computer graphic image and the video signals are combined with each other in the form of a video signal. FIG. 5 shows a display screen representing the composite image generated from the computer graphic image and the video signals.

FIG. 6 is a control table for controlling connections of the frame memory constituent elements to the video signal input and output sections. This table is kept in the control section 15.

In this embodiment, the input buffer is configured in a double buffer system. The elements 1 and 2 are assigned to a buffer a, whereas the elements 3 and 4 are allocated to a buffer b. On the other hand, the output buffer is structured in a double buffer system. The elements 5 and 6 are assigned to a buffer a, whereas the elements 7 and 8 are allocated to a buffer b.

By changing entries registered to the control table to alter a combination of the plural memory elements, it is possible to use the elements in the single, double, and triple buffer system.

Figure 7:
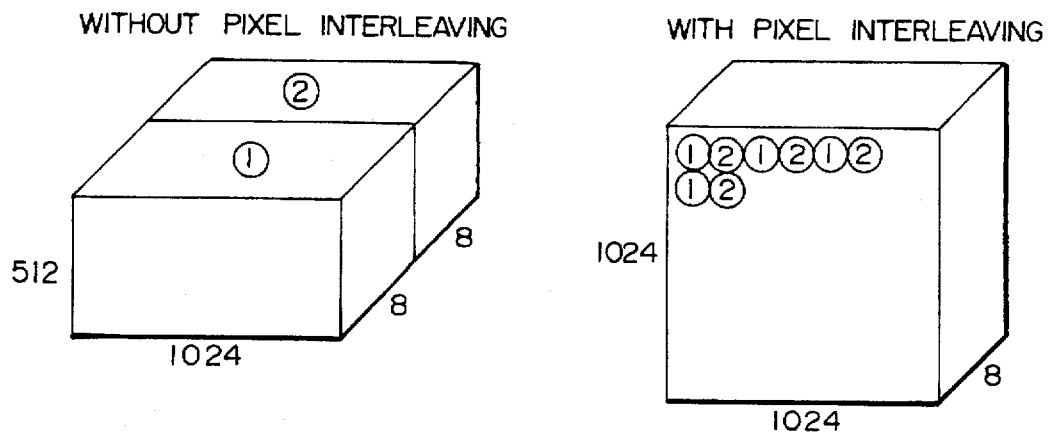
FIG. 7 is a diagram for explaining the construction of a frame memory in relation to presence and absence of pixel interleaving.

FIG. 7 is a diagram for explaining the frame memory configuration in association with presence or absence of pixel interleaving.

Description will now be given of an example in which the operation is achieved for a combination of the elements 1 and 2. Assume the size of each element to be 512 pixels in the vertical direction, 1024 pixels in the horizontal direction, and eight bits in depth. When the pixel interleaving is not carried out, image data can be entirely stored in a single element. However, in this example, two elements are arranged in an overlapped manner depth-wise to form a frame memory which is 512 pixels in the vertical direction, 1024 pixels in the horizontal direction, and eight bits in depth. When the interleaving of pixels is conducted, each element is used to sequentially store two adjacent pixels of image data associated with the memory size, i.e., 512 pixels in the vertical direction, 1024 pixels in the horizontal direction, and eight bits in depth.

The presence or absence of pixel interleaving is registered to the control table of FIG. 6.

By changing over the pixel interleaving between the frame memory elements, the frame memory size and the memory access speed can be optimized for video signals which necessitate a high-speed read/write operation through a concurrent memory access and which are associated with a large image size as well as for video signals for which a sufficiently long read/write period is available and which are related to a small image size.

Figure 8:
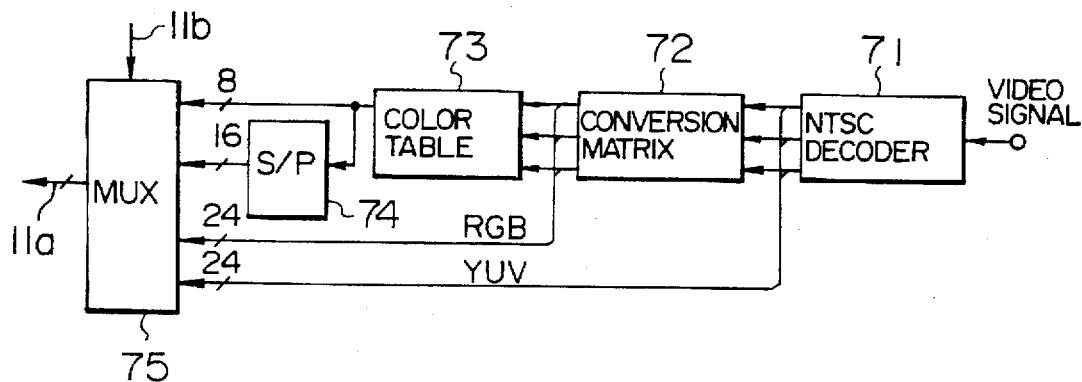
FIG. 8 is a block diagram showing the structure of the video input section.

FIG. 8 is a block diagram showing the structure of the video signal input section. The configuration includes an NTSC decoder 71 to transform an NTSC signal into a YUV signal, a conversion matrix 72 for converting the YUV signal into an RGB signal, a color table 73 for transforming the RGB signal into image data including a reduced number of bits, a serial/parallel converting section 74 to parallelize image data based on the pixel interleaving, and a selecting or multiplexing section 75 for selecting either one of the YUV signal, RGB signal, and the image data obtained from the RGB signal according to a control signal received from a line 11b. Image data output from the section 75 is connected via a signal line 11a to the frame memory constituent elements.

It is assumed in this embodiment that the input video signals are NTSC signals used as television signals in the U.S. and Japan. However, for the PAL signals employed in Europe and the high definition television (HDTV) signals, the embodiment can be operated in the similar manner by merely replacing the NTSC decoder 71 with a decoder associated with the pertinent signal system.

Figure 9:
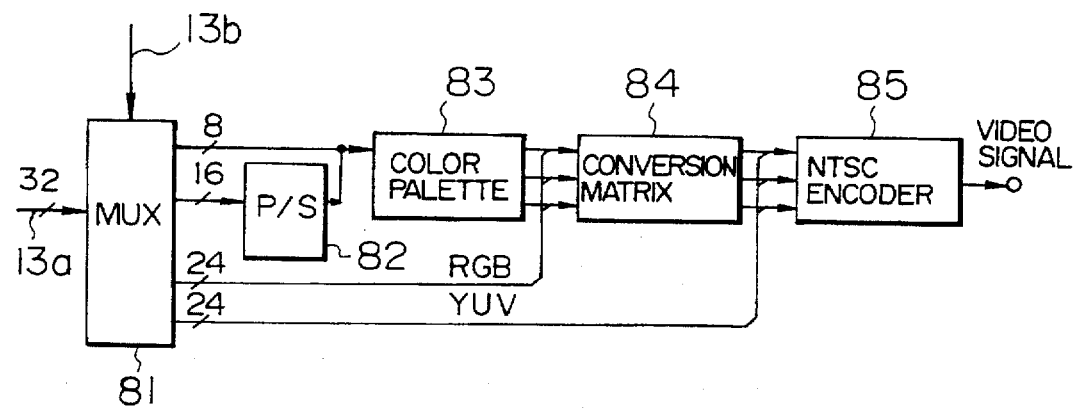
FIG. 9 is a block diagram showing the construction of the video output section.

FIG. 9 shows in a block diagram the construction of the video signal output section. This system includes a selecting or multiplexing section 81 for determining the image data from the elements to be either one of the YUV signal, RGB signal, and the image data obtained from the RGB signal according to a control signal received from a line 13b, a signal line 13a for supplying the image data from the elements to the multiplexing section 81, a parallel/serial converting section 82 for converting the image data into serial data according to the pixel interleaving, a color table 83 for converting the image data-including the limited number of bits into an RGB signal, a converter matrix 84 for converting the RGB signal into a YUV signal, and an NTSC encoder 85 for transforming the YUV signal into an NTSC signal.

In this embodiment, the input video signals are assumed to be NTSC signals used as television signals in the U.S. and Japan. However, for the PAL signals and the HDTV signals, the embodiment can be operated in the same manner only by replacing the NTSC decoder 85 with a decoder associated with the pertinent signal system.

Figure 10:
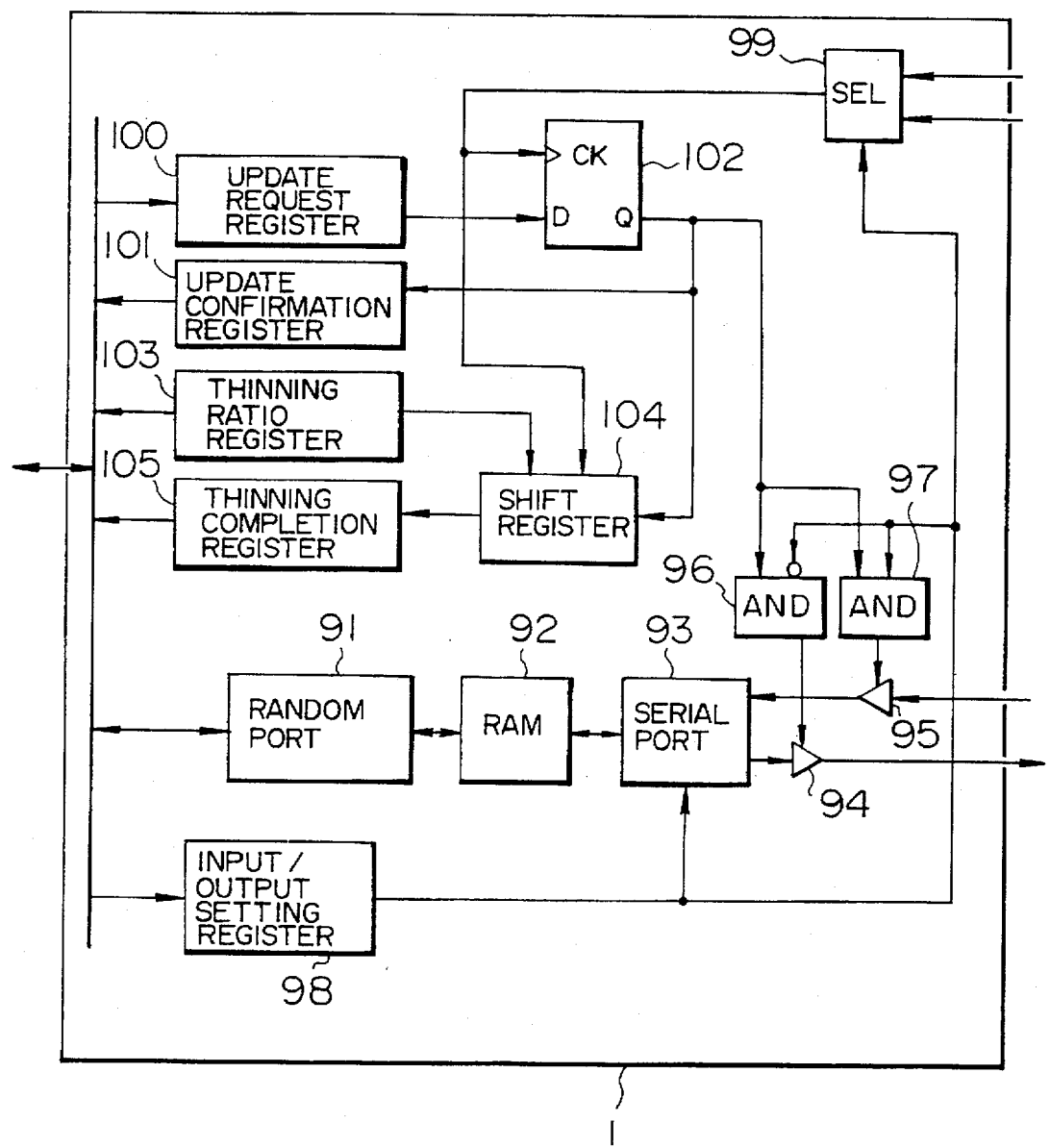
FIG. 10 is a block diagram showing the configuration of the frame memory constituent element.

FIG. 10 shows in a block diagram the constitution of the frame memory constituent element. The configuration includes a random port 91, a random access memory (RAM) 92, a serial port 93, a buffer 94 for connecting or disconnecting the video signal output section, and a buffer 95 for connecting or disconnecting the video signal input section. These buffers 94 and 95 are operated under control of the control section 15 for establishing connection or disconnection of the video signal input or output section when either one of the input and output sections is selected for connection. Moreover, as will be described later in conjunction with FIG. 11, when the image drawing section 16 accesses the memory, the buffers 94 and 95 disconnect the data paths to prevent data from being delivered to the memory. The system further includes a condition judging section 97 for controlling the disconnection of the buffer 95, an input/output setting register 98, a selector 99 for achieving a change-over operation between the frame synchronizing signal of the input video signal and that of the output video signal, an update request register 100, an update confirmation register 101, a synchronization adjusting section 102, a thinning ratio register 103, a shift register 104, and a thinning completion register 105.

The operation procedure of registers and other components constituting the frame memory constituent element will be clarified in the following description of FIGS. 11 to 15.

Figure 16:
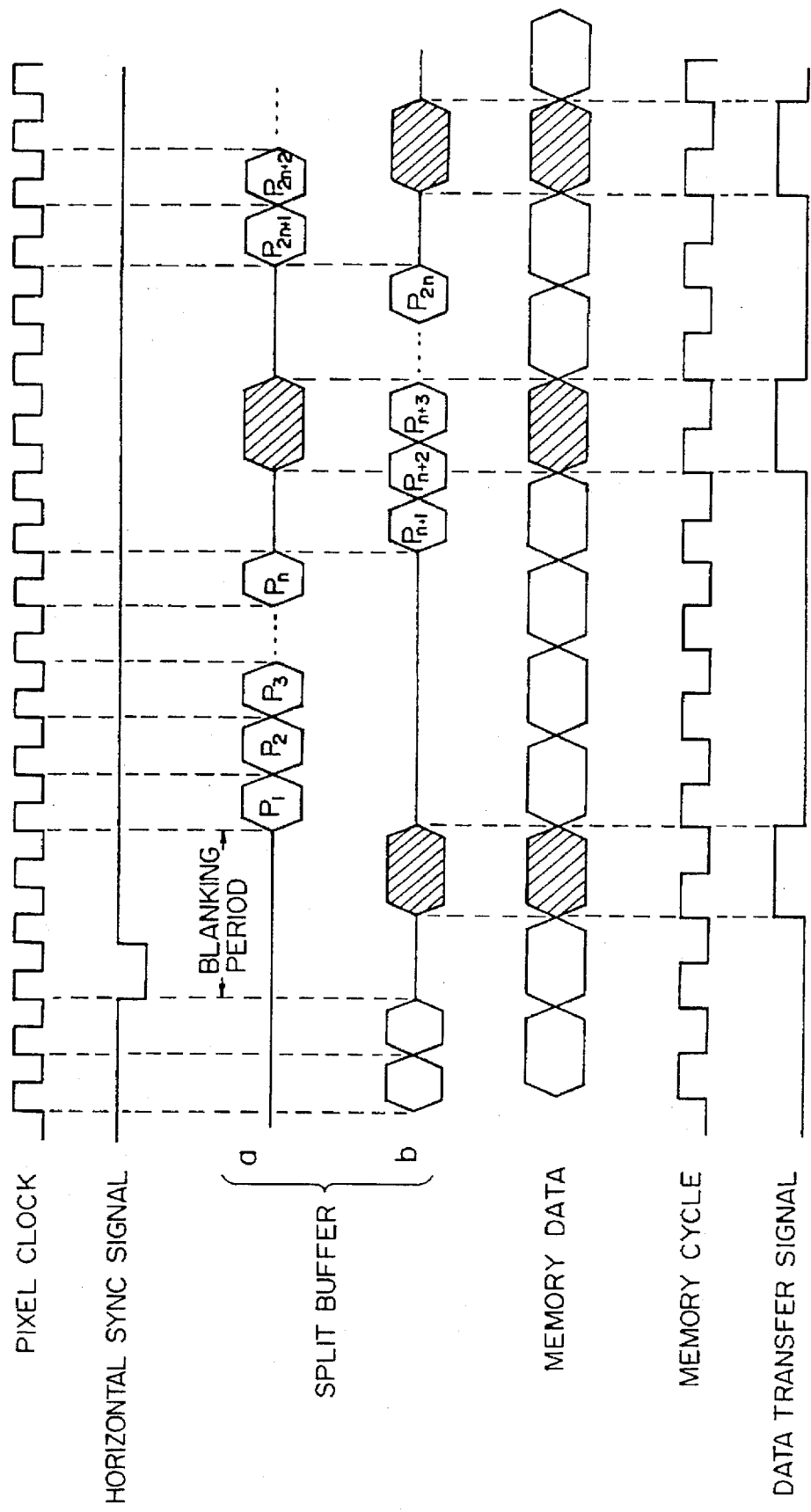
FIG. 16 is a signal timing chart for explaining the operation of a VRAM in frame memory constituent elements.

For the RAM 92, there may be used a general-purpose video RAM (VRAM). The VRAM includes therein a buffer called a split buffer to absorb the difference between the pixel clock signals respectively of the input and output video signals. If there is employed a dynamic RAM (DRAM) or a static RAM (SRAM) in place of the VRAM, it is only necessary to add a buffer for absorbing the pixel clock difference. FIG. 16 is a signal timing chart useful to explain the VRAM in the frame memory constituent element. In this diagram, video signals are delivered from the video signal input section 11 to the elements 1 to 4. The pixel clock signal indicating the pixel cycle of the input video signal is asynchronous with the memory cycle. In the blanking period immediately after the horizontal synchronizing signal, there does not exist any effective pixel information.

In general, the split buffer of the VRAM is configured in the double buffer system; however, each constituent buffer has a storage capacity which is not sufficient to store therein input video signals equivalent to a raster. After the blanking period, video signals are therefore input to the split buffer capable of storing n pixels at a timing synchronized with a pixel clock signal. Subsequently, the split buffer is changed over such that the n succeeding pixels are stored in the other split buffer. During this operation, data of n pixels completely stored in the split buffer is transferred therefrom to the memory. The data transfer operation is driven by an indication of a data transfer signal synchronized with the memory cycle. As a result of the above operation, there can be absorbed the operation difference appearing because the pixel clock signal is asynchronous with respect to the memory cycle.

Figure 11:
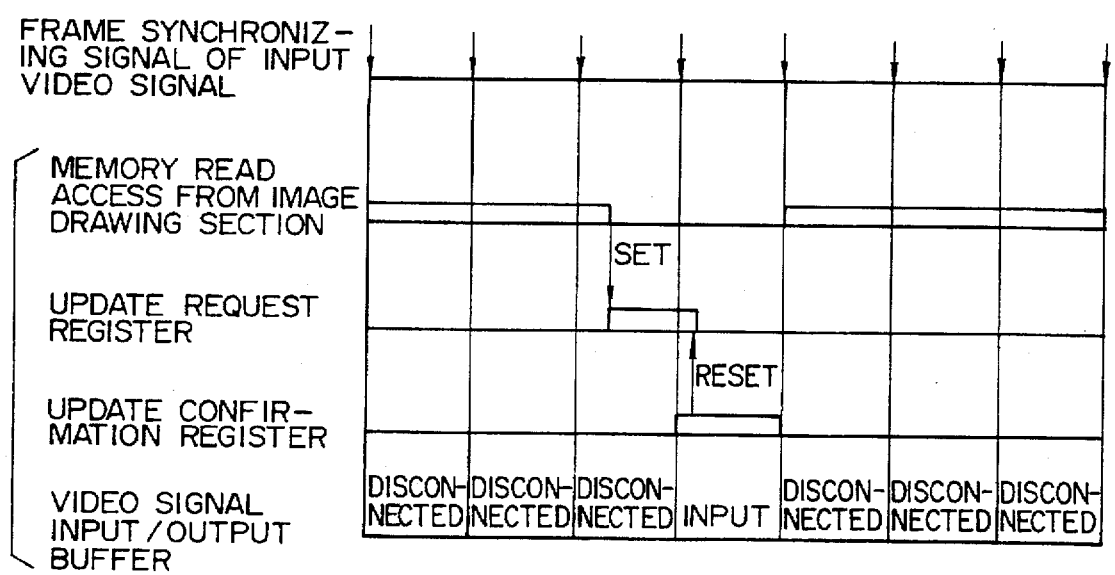
FIG. 11 is a signal timing chart in an operation in which a new frame is stored as a still picture in updated frame memory constituent elements.

FIG. 11 is a signal timing chart showing the operation in which data of a new frame is memorized as a still image in an update frame memory constituent element.

The image drawing section 16 issues, when the image data is completely read from the elements 1 to 4 assigned to the input operation, an update request instruction and sets the instruction to the update request register 100. The synchronization adjuster 102 supplies the update confirmation register 101, in synchronism with the frame synchronizing signal, with information that the instruction has been set to the update request register 100. Confirming the condition of the register 101, the image drawing section 16 resets the update request register 100. The synchronization adjusting section 102 notifies information that the register 100 has been thus reset to the update confirmation register 101 at a timing synchronized with the frame synchronizing signal in the same manner as for the notification of the setting of the instruction to the register 100. As a result, the update confirmation register 101 remains in the state (set with the signal) for a period of one frame. On the other hand, the signal set to the register 101 for the period of one frame is also sent to the condition judging section 97. The section 97 controls disconnection of the buffer 95 to connect the frame memory constituent element to the video signal input section. During the period of time in which the buffer 95 is kept disconnected, the contents of the elements linked with the video signal input section remain unchanged so that the image data can be delivered therefrom to the image drawing section 16.

As set forth above, in response to a frame update request instruction issued to the elements selected for connection to the video signal input section, image data of a frame of input video signals is stored as a new still image in the elements.

Figure 12:
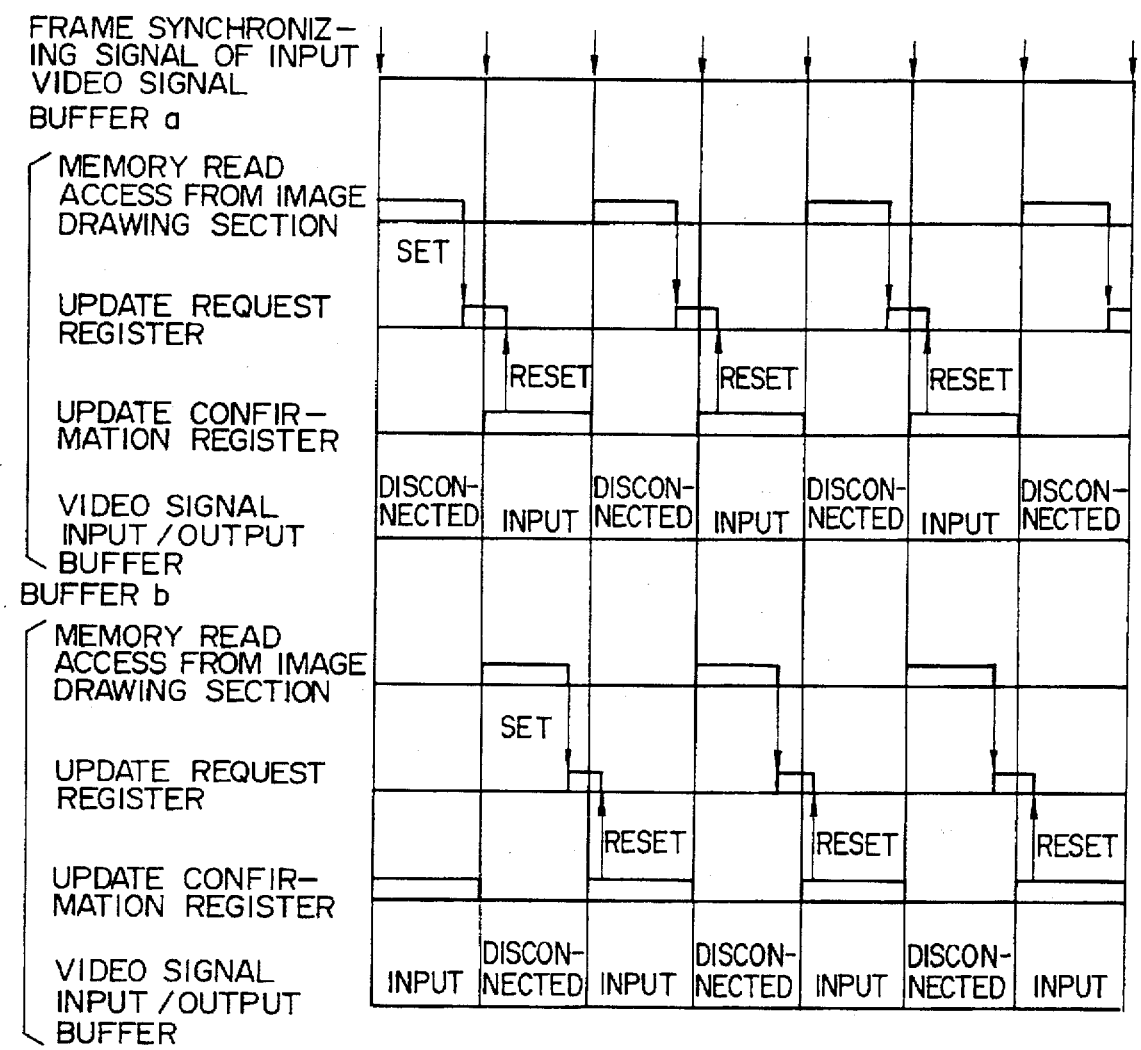
FIG. 12 is a signal timing chart in an operation in which each frame of input video signals is stored in frame memory constituent elements.

FIG. 12 is a signal timing chart showing the operation in which each frame of input video signals is memorized as a mobile picture in the frame memory constituent elements.

This diagram shows by way of example an operation in which the elements 1 to 4 for input use are operated in the double buffer system. The image drawing section 16 sets, when image data is completely acquired from the buffer a, the update request register 100 related to the buffer a. To the update confirmation register 101, the synchronization adjuster 102 reports, at a timing synchronized with the frame synchronizing signal, that the register 100 has been set. Confirming the condition of the register 101, which has been thus set, the section 16 resets the register 100. During the period of time in which the register 101 associated with the buffer a is kept set, it is possible to read image data from the buffer b. At completion of the read operation, the section 16 sets the register 100 related to the buffer b. Confirming that the register 101 has been set, the section 16 resets the register 100. During the period of time in which the register 101 associated with the buffer b is kept thus set, image data can be read from the buffer b. When the read operation is finished, the section 16 again sets the register 100 related to the buffer a. The respective frames of input video signals can be memorized in the elements by repeatedly conducting the operation set forth above.

However, it is assumed here that the period of time required for the image drawing section 16 to read image data from the double buffer unit is within the period of one frame in any case.

As described above with reference to FIG. 11, with the provision of the change-over operation between the control methods of controlling registers by the image drawing section, there can be implemented the update operation and the input operation. In the update operation, before an issuance of a frame update request instruction, the contents of the frame memory constituent elements remain unchanged such that when the instruction is issued, only a frame of input video signals is updated as a still picture in the elements. In the input operation, the frame memory constituent elements selected for connection to the video signal input section receive, as mobile picture inputs thereto, the respective frames of video signals.

Figure 13:
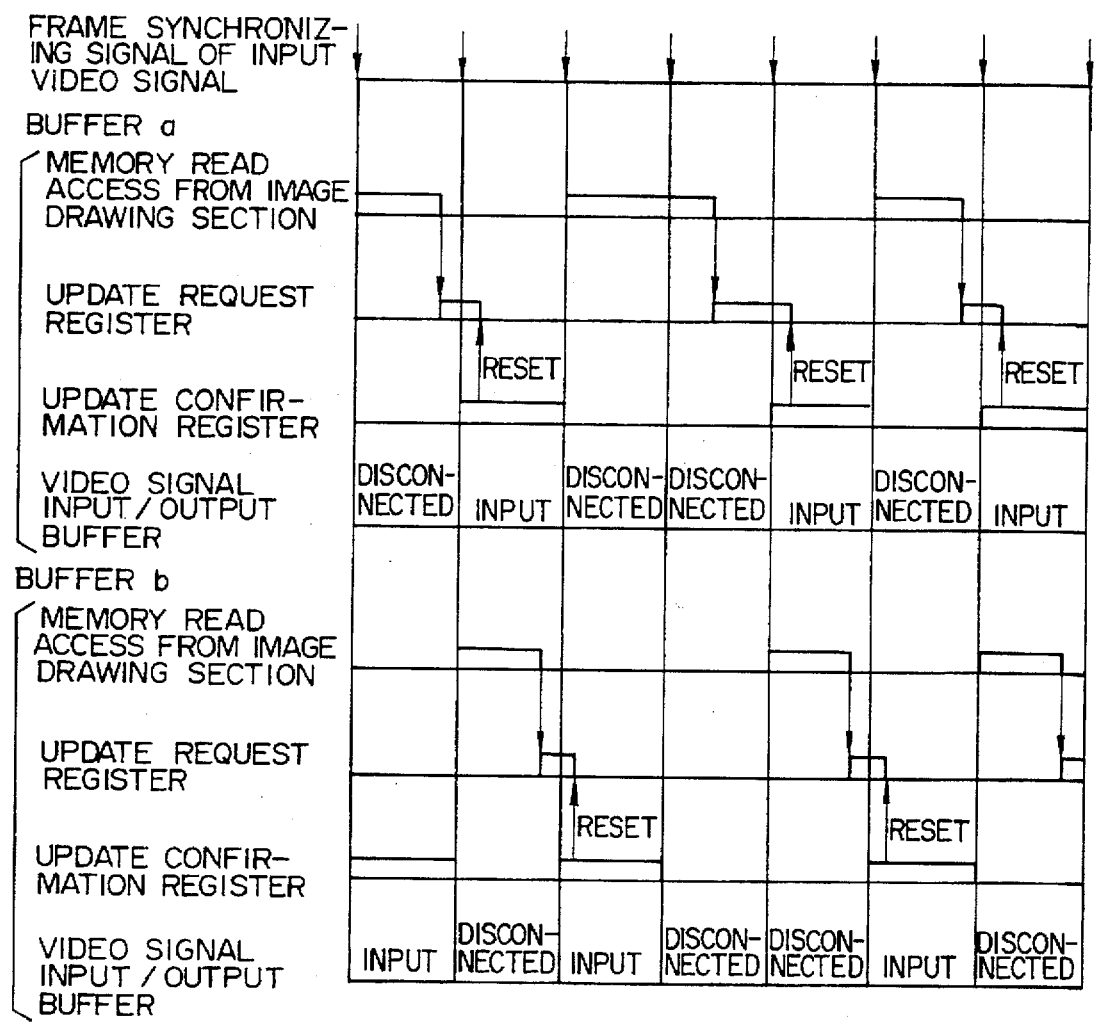
FIG. 13 is a signal timing chart showing an operation in FIG. 12 in which data read by an image drawing section from frame memory constituent elements exceeds the period of one frame.

FIG. 13 is a signal timing chart showing the operation in which the period of time required for the image drawing section to read image data from the elements exceeds the period of one frame.

In this example, the frame memory elements 1 to 4 are used in the double buffer system. The image drawing section 16 sets, when image data is completely read from the buffer a, the update request register 100 related to the buffer a. To the update confirmation register 101, the synchronization adjusting section 102 notifies in synchronism with the frame synchronizing signal that the register 100 has been set. Confirming the condition of the register 101, the section 16 resets the register 100. During the period of time in which the register 101 is kept set, image data can be read from the buffer b. At completion of the read operation, the section 16 sets the register 100. Confirming the condition of the register 101 thus set, the section 16 resets the register 100. Up to this point, the operation is the same as that described in conjunction with FIG. 12.

In the case where the operation of the image drawing section to read image data from the elements cannot be completed within the period of one frame, the read processing is continuously executed in the period of the subsequent frame. After the read operation is terminated, the section 16 sets the register 100 related to the buffer a. Thereafter, control returns to the ordinary procedure of controlling registers as shown in FIG. 12.

Figure 14:
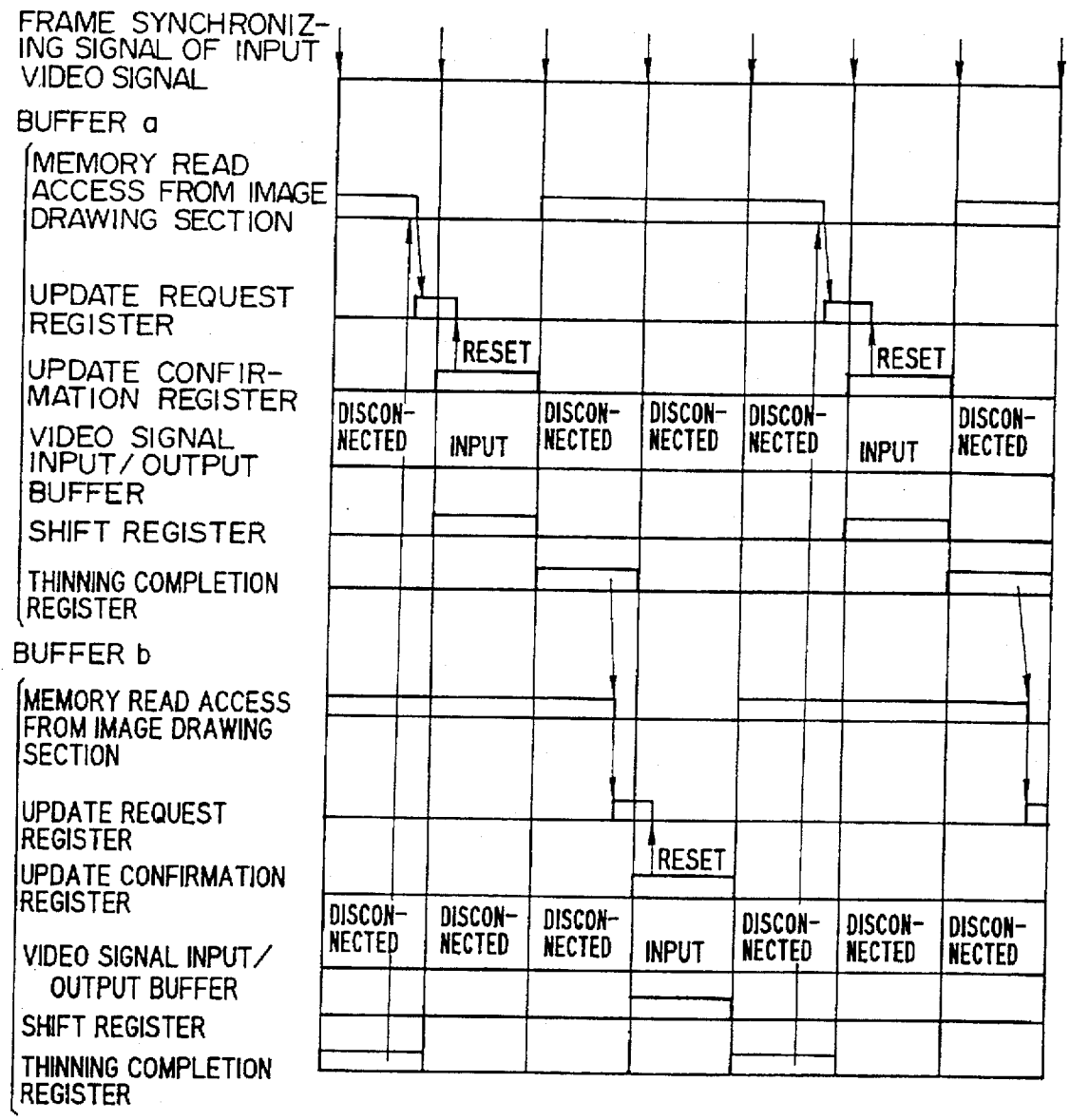
FIG. 14 is a signal timing chart showing an operation in which a frame of input video signals associated with a thinning operation or a time lapse is stored in frame memory constituent elements.

FIG. 14 is a signal timing chart showing the operation in which a frame of input video signal having undergone the thinning operation is memorized in the frame memory constituent elements.

In this example, the elements are used in the double buffer system for input use. The amount of signals are thinned out to be half the original amount and hence the thinning ratio "½" is set to the thinning ratio register 103.

The section 16 sets, after image data is completely obtained, the register 100 associated with the buffer a. To the update confirmation register 101, the synchronization adjusting section 102 notifies in synchronism with the frame synchronizing signal that the register 100 has been set. The output from the adjusting section 102 is delivered also to the shift register 104. In the register 104, the output from the adjuster 102 is delayed by the period of one frame and is then supplied to the thinning completion register 105. Confirming that the register 101 has been set, the section 16 resets the register 100. Subsequently, the section 16 confirms that the register 105 related to the buffer a has been set. In addition, when image data is completely read from the buffer b, the section 16 sets the register 100 associated with the buffer b. Thereafter, the operation is similarly repeated as described above.

According to the processing procedure, a moving picture can be input to the memory elements depending on the thinning ratio. In this connection, the number of stages of the shift register 104 is required to be altered according to the thinning ratio.

Moreover, there may be employed, in place of the thinning control means adopting the thinning ratio register 103 and the shift register 104, a control table in which the presence or absence of thinning operation is registered for each of 30 frames per second, thereby arbitrarily setting the number of frames to be updated per second.

Figure 15:
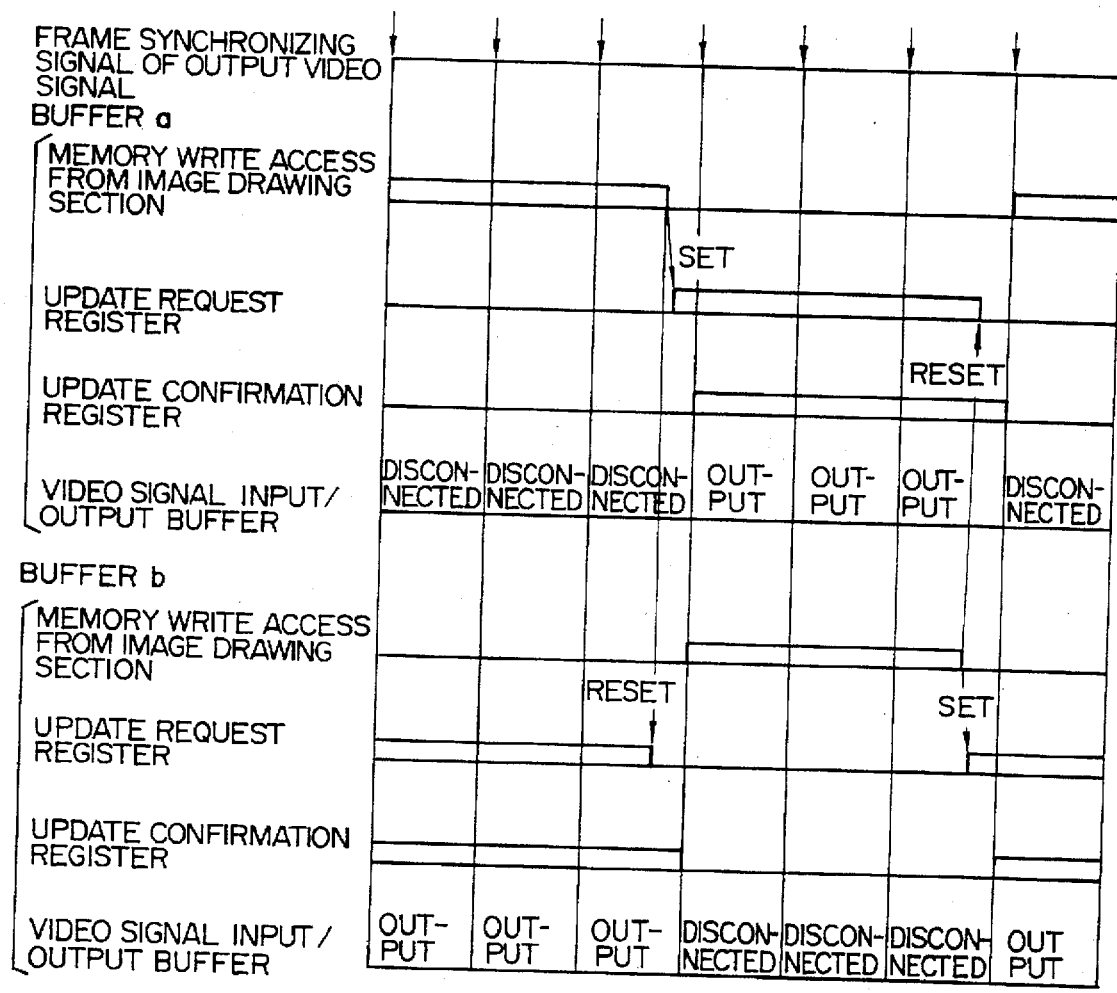
FIG. 15 is a signal timing chart showing an operation in which video signals are output via a double buffer system from frame memory constituent elements connected to the video signal output section.

FIG. 15 is a signal timing chart showing an operation in which video signals from the frame memory elements connected to the video signal output section are output via a double buffer system.

In this example, the memory elements are used in the double buffer system. When image data is completely written in the buffer a, the image drawing section 16 sets the update request register 100 associated with the buffer a and then resets the update request register 100 related to the buffer b. To the update confirmation register 101, the synchronization adjusting section 102 reports in synchronism with the frame synchronizing signal that the register 100 has been set. However, even when the section 16 confirms that the register 101 is thus set, the section 16 does not reset the register 100. Subsequently, when the write operation on the buffer b is finished, the section 16 sets the register 100 and resets the register 100 associated with the buffer a. After this point, the operation above is repeatedly achieved in the similar manner.

On the other hand, the signal set to the register 101 is also sent to the condition judging section 96. This section 96 controls disconnection of the buffer 94 to connect memory elements to the video signal input section. During the period of time in which the buffer 94 is kept disconnected, video data can be written in the elements 5 to 8 connected to the video signal output section from the drawing section 16.

As described above, using a frame update request instruction for updating the contents of memory elements selected for connection to the video signal output section, it is possible to control the elements selected as output buffers for connection to the video signal output section.

Figure 17:
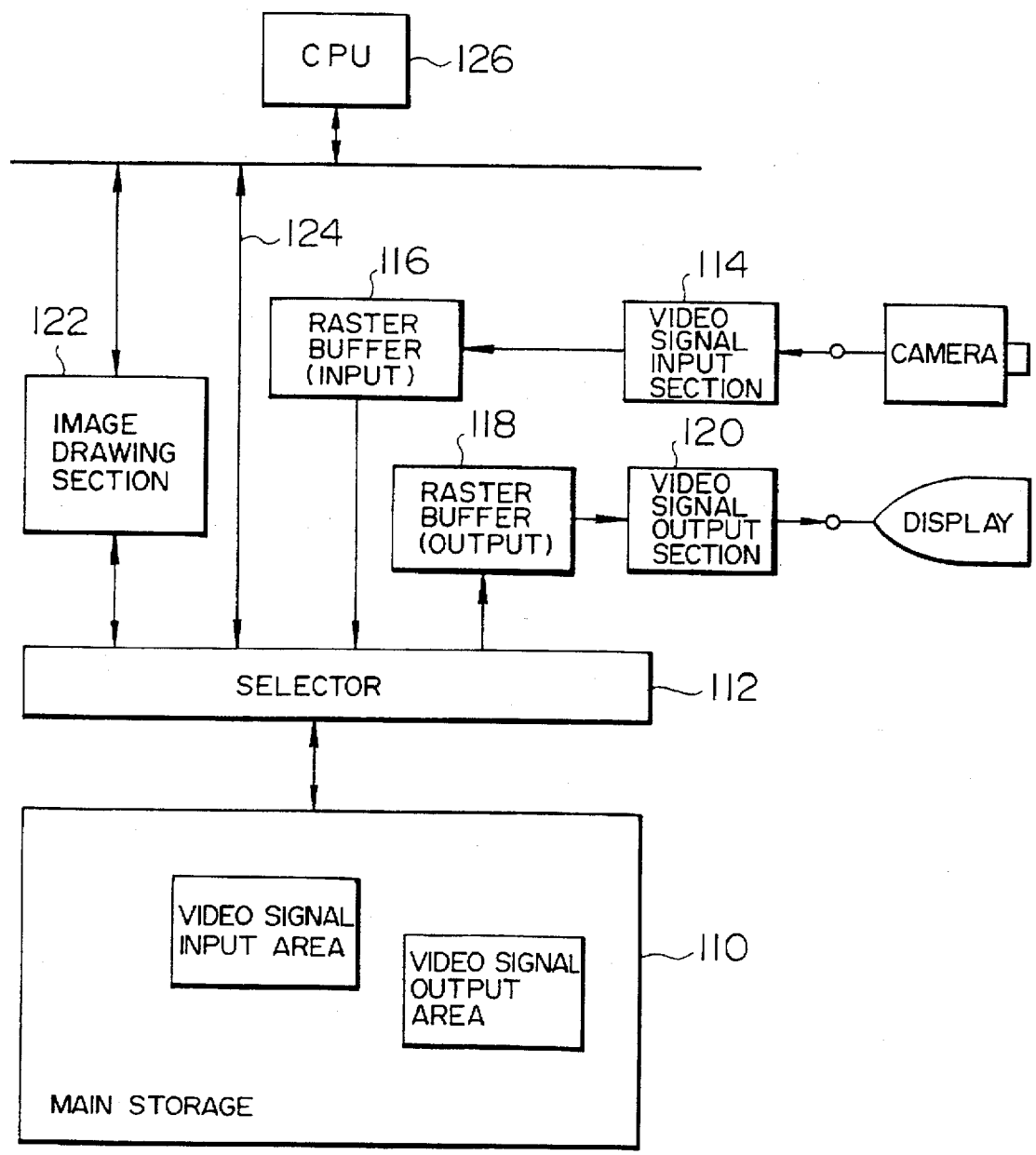
FIG. 17 is a block diagram showing the structure of an alternative embodiment according to the present invention.

FIG. 17 is a block diagram showing the constitution of an alternative embodiment in accordance with the present invention. This system includes a main storage 110, a selector 112, a video signal input section 114, a raster buffer 116 for inputting therein video signals, a raster buffer 118 for outputting video signals, a video signal output section 120, an image drawing section 122, and a CPU 126. In the main memory 110, there are stored programs, data related thereto, graphic data before and after development, input data of video signals, and display data of video signals.

Video signals received as input data are converted by the video signal input section 114 into digital image data. The image data equivalent to one raster is then temporarily stored in the raster buffer 116 at a timing synchronized with the pixel clock signal of the input video signals. Next, when the selector 112 selects the raster buffer 116, the input data is read therefrom in synchronism with the memory cycle to be delivered to the main memory 110. Conversely, when display data of video signals are to be output from the main memory 110, display data equivalent to one raster is delivered from the main memory 110 in synchronism with the memory cycle to the raster buffer 118 selected by the selector 112. The video signal output section 120 then reads the contents of the raster buffer 118 at a timing synchronized with the pixel clock signal of the output video signals to transform the obtained data into video signals.

The CPU 126 controls the programs, data thereof, and graphic data of computer graphics. First, in a case where the graphic data is developed in the image drawing section 122, the selector 112 selects the section 122 to supply the graphic data from the main storage 110 to the section 122. The drawing section 122 develops the data and then sends the developed data via the selector 112 to the memory 110. On the other hand, when inputting and outputting the programs and data related thereto to and from the main memory 110, the selector 112 selects a signal line 124 to connect the memory 110 to the CPU 126. Namely, the selector 112 selects either one of the input and output buffers 118, the image drawing section 122, and the signal line 124 to connect the selected unit to the main memory 110.

In this embodiment, there is adopted a single-port structure for the main storage 110, which is implemented by used of a dynamic RAM (DRAM).

In the video signal input area of the main memory 110 for storing the input data of video signals and the video signal output area thereof for storing the display data of video signals, it is possible to reserve an area having an arbitrary size in the unit of a pixel. For this purpose, an address map need only be produced to allocate memory areas to the respective video signal input and output areas. Alternatively, the main memory 110 may be partitioned in advance into memory areas each having a fixed size, i.e. into frame memory constituent elements such that the video signal input and output areas are defined according to combinations of these memory elements.

In this connection, as an alternative embodiment according to the present invention, in the constitution of FIG. 1, an input interface section for establishing access interface from input devices such as a mouse and a keyboard and a communication controller for controlling communications with other apparatuses may be connected to the bus 17 to achieve intercommunications between the apparatuses, thereby easily realizing a remote conference system.

In accordance with the embodiments of the present invention above, each frame memory constituent element selects connection to the video signal input or output section. Consequently, when the controller determines the connection, the element can be used to output or to input video signals. Moreover, since the memory elements are of the same structure, even when the number thereof is increased, the same procedure can be employed, which consequently facilitates addition of memory elements to the system. Each of the input and output sections can be connected to an arbitrary number of memory elements.

Referring next to the drawings, a detailed description will be given of an embodiment achieving the second object of the present invention.

Figure 18:
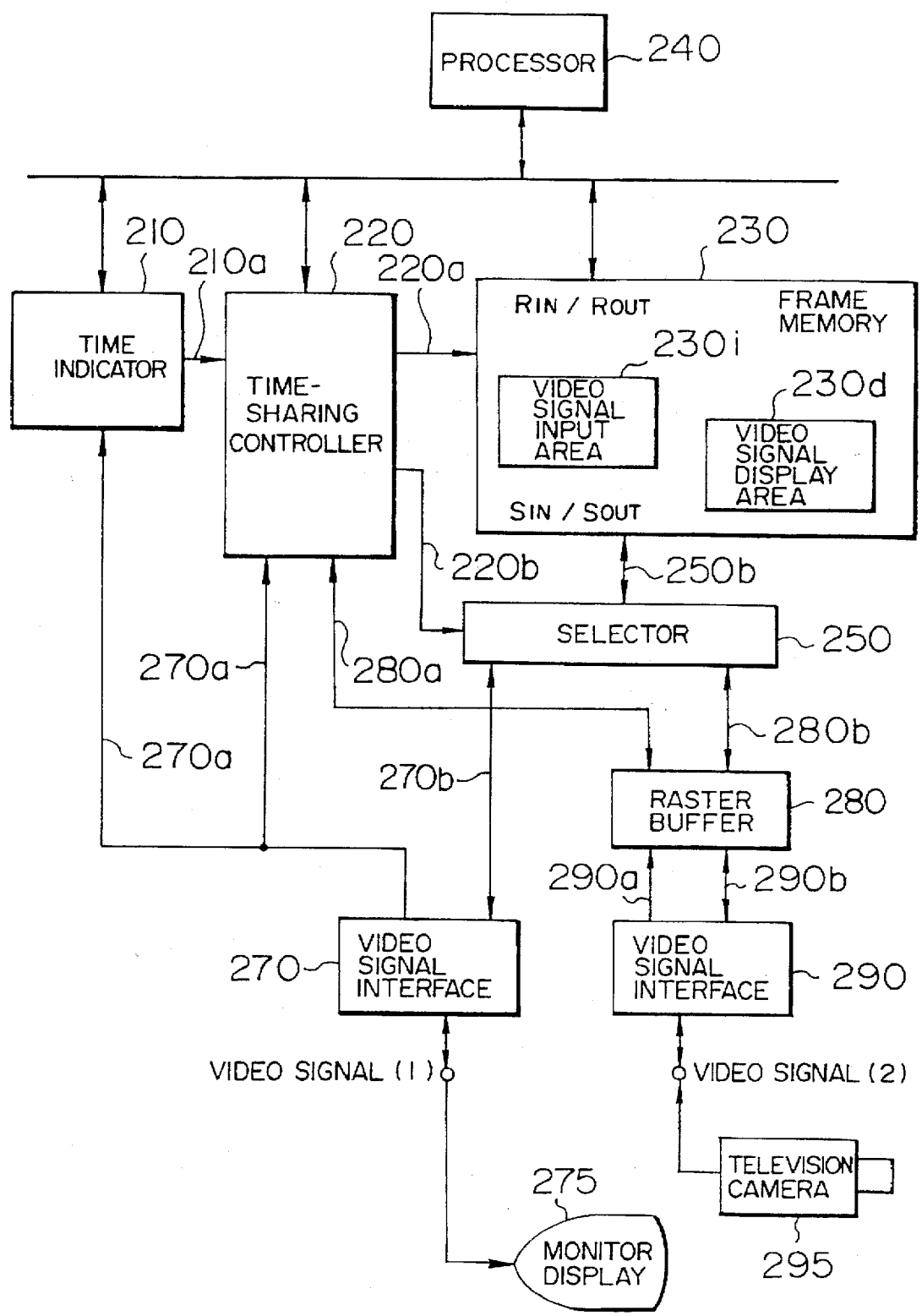
FIG. 18 is a block diagram showing a second embodiment according to the present invention.

FIG. 18 shows in a block diagram the construction of a second embodiment according to the present invention. The system includes a time indicator 210, a time-sharing controller 220, a frame memory 230, a processor 240, a selector 250, a video signal interface 270 for a first video signal, a television camera 295, a raster buffer 280 for a second video signal, a video signal interface 290 for a second video signal, and a monitor display 275.

The time indicating section 210 sets, as raster data transfer periods, a horizontal blanking period and a horizontal effective period constituting a raster period of the first video signal. The time-sharing control section 220 assigns the raster data transfer period matching the horizontal effective period notified from the time indicator 210 to the transfer period of each raster data of the first video signal. Moreover, the raster data transfer period matching the horizontal blanking period is assigned to the transfer period of each raster data of the second video signal. The processor 240 controls the time indicator 210 and the time-sharing controller 220 and processes raster data stored in the frame memory 230. Each of the raster buffer 280 and the interface sections 270 and 290 can be set for the input and output operations.

When the interface 270 is set for an output operation, during the raster transfer period matching the horizontal effective period, raster data stored in the display area 230d of the frame memory 230 is output via a signal line 270b to the interface 270 to be combined with a horizontal synchronizing signal generated therein, thereby delivering the resultant signal to the display 275. The horizontal synchronizing signal is supplied via a signal line 270a to the time indicator 210 and the time-sharing controller 220.

On the other hand, when the buffer 280 and the interface 290 are set for an input operation, the second video signal produced from the television camera 295 is separated by the interface 290 into a synchronizing signal 290a and raster data 290b to be temporarily stored in the raster buffer 280. On receiving the data, the raster buffer 280 issues a raster data transfer request onto a signal line 280a. When an answer that the raster data of the second video signal can be transferred during the raster period matching the horizontal blanking period is received via the signal line 280b, data associated with a raster is written therefrom in the area 230i of the frame memory 230 via a signal line 280b, the selector 250, and a signal line 250b.

According to the embodiment, in an operation in which data of a high-frequency video signal is read from the frame memory, a horizontal blanking period not used for the access to the memory can be used to transfer data of a low-frequency video signal to the same frame memory. For the video signals respectively of two channels, there are generally used synchronizing signals different from each other. However, in this operation, a request for allocation of a horizontal blanking period is issued after the low-frequency video signal for a raster is thus prepared such that the data transfer is initiated only after the answer is received. Consequently, the different synchronizing signals can be allowed in the data transfer.

Hereinbelow, with the video signal interface set as a boundary, a signal to be input or output from or to an external side is called a video signal, whereas a video signal to be treated in the unit of the raster in the raster buffer and the frame memory is referred to as raster data.

Details about the operation of the embodiment will be described later with reference to FIG. 21.

Figure 19:
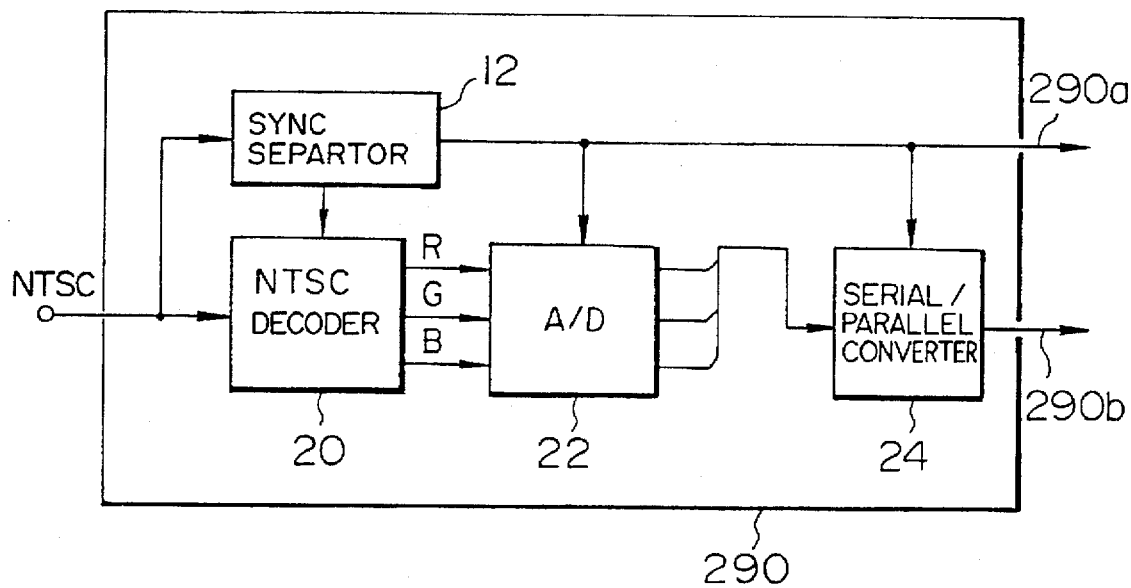
FIG. 19 is a block diagram showing the construction of a video signal interface circuit for receiving an NTSC video signal as an input thereto.

FIG. 19 shows in a block diagram the structure of the video signal interface for inputting an NTSC . video signal. This constitution includes a video signal interface 290, an NTSC decoder 20, an analog/digital converter (A/D) 22, a serial/parallel converter 24, and synchronizing signal separator 12.

The decoder 20 transforms an NTSC video signal input thereto into an RGB video signal, whereas the A/D converter 22 converts the RGB video signal into a digital signal. To input or output video signal of a plurality of channels in or from a frame memory, it is necessary to minimize the frame memory access time per raster as compared with the case of input and output operations of signals via a single channel. For this purpose, the signal processing is parallelized, namely, a plurality of pixels are efficiently accessed in the frame memory. The raster supplied to the serial/parallel converter 24 is thus parallelized to be output to a signal line 290b. The synchronizing signal separator 12 creates a horizontal synchronizing signal synchronized with the raster of the NTSC video signal and then outputs the resultant signal to the decoder 20, the A/D converter 22, the serial/parallel converter 24, and a signal line 290a.

Figure 20:
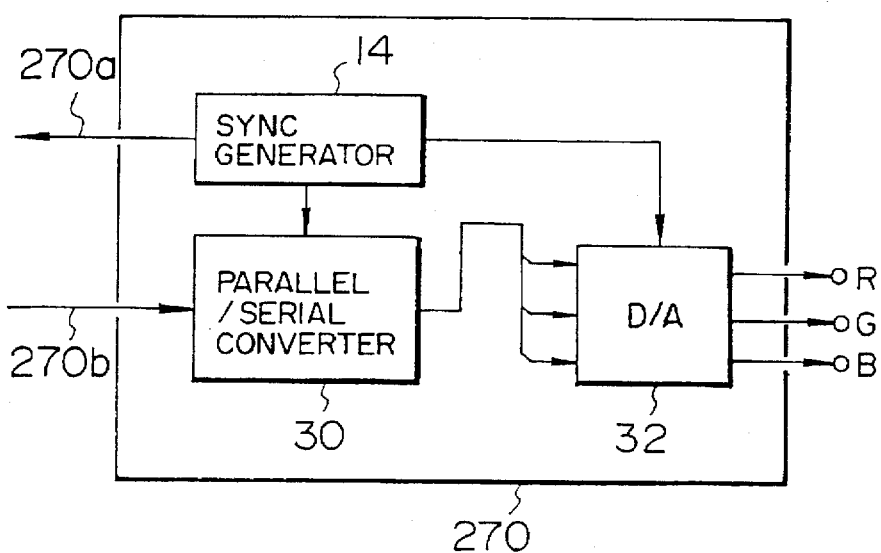
FIG. 20 is a block diagram showing the construction of a video signal interface circuit for outputting an RGB video signal therefrom.

FIG. 20 is a block diagram showing the configuration of the video signal interface for outputting the RGB video signal. The structure includes a video signal interface 270, a parallel/serial converter 30, a digital/analog converter (D/A) 32, and a synchronizing signal generator 14.

A raster supplied via the line 270b to the converter 30 has been parallelized to minimize the frame memory access time per raster. The converter 30 serializes the received data for each pixel to send the resultant data to the D/A converter 32. The data is converted into an RGB video signal to be output therefrom. The generator 14 produces a horizontal synchronizing signal synchronized in time with the raster of the RGB video signal and then sends the signal to the parallel/serial converter 30, the D/A converter 32, and the line 270a.

Figure 21:
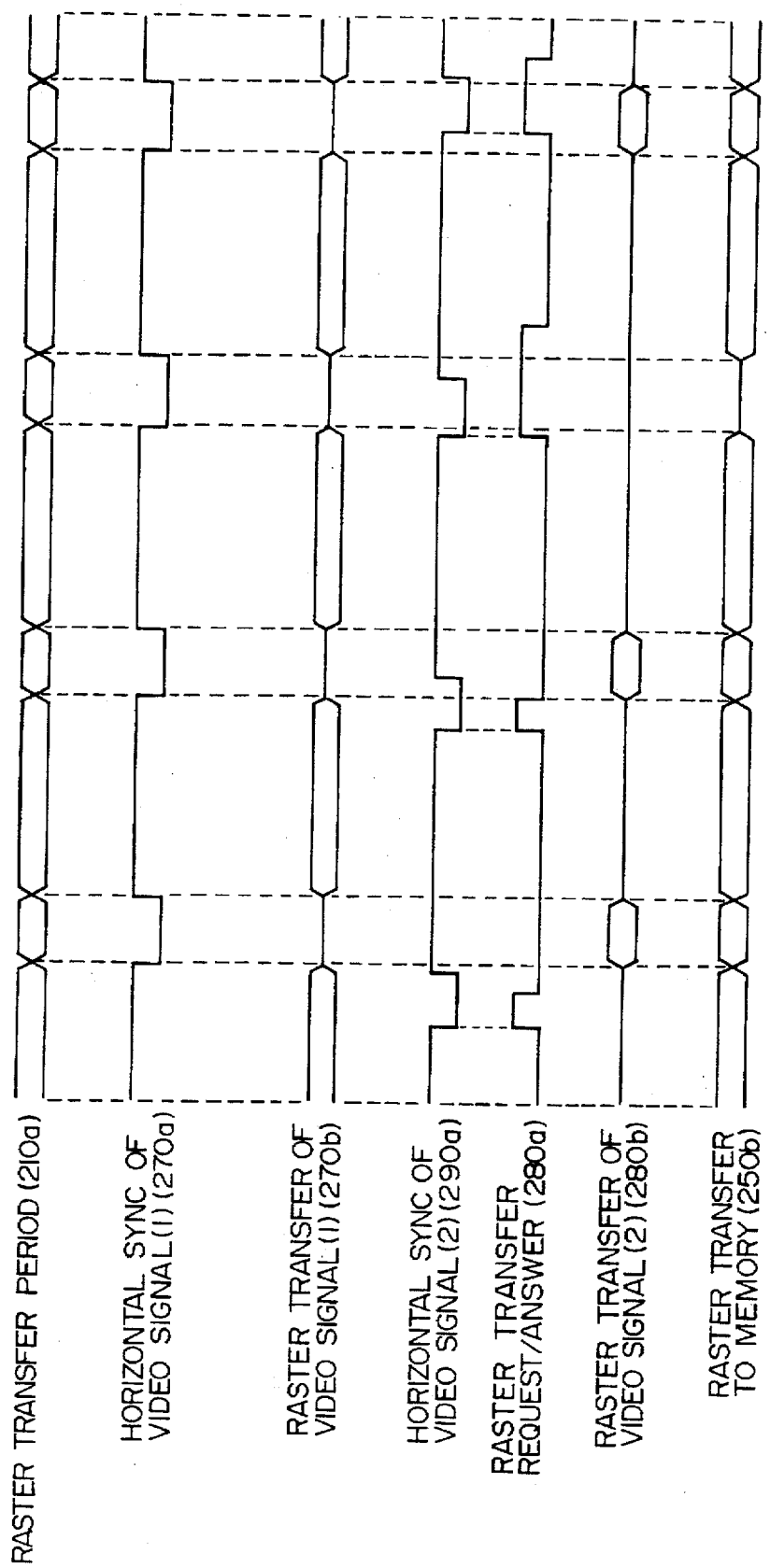
FIG. 21 is a signal timing chart for explaining the basic operation of the second embodiment.

FIG. 21 is a signal timing chart useful to explain the operation of the second embodiment.

The raster data transfer period is subdivided in association with the horizontal blanking period and the horizontal effective period of the raster period of the first video signal. The time-sharing section 220 assigns the raster data transfer period coincident with the horizontal effective period as the transfer period of each raster data of the first video signal. In the raster data transfer period, the interface 270 transfers data equivalent to a raster from the frame memory 230 via the line 270b.

On the other hand, after the buffer 280 for the second video signal and the interface 290 are set for an input operation, the data of a raster is stored via the interface 290 in the raster buffer 280. When the data is completely stored in the buffer 280, namely, when the succeeding horizontal synchronizing signal is established, a raster data transfer request is issued to a line 280a. In the FIG. 21, the request is indicated by a rising edge of the raster data transfer request/answer signal. When the controller 220 allocates a raster data transfer period coincident with the horizontal blanking period, allowance of transfer is notified as a response thereto via the line 280a to the raster buffer 280. In the diagram, the answer is notified by a falling edge of the raster data transfer request/answer signal. The raster buffer 280 then transfers therefrom data equivalent to a raster via a signal line 280b to the frame memory 230. The raster data transfer via the signal line 250b connected to the frame memory is implemented through the raster data transfers via the lines 270b and 280b.

Figure 29:
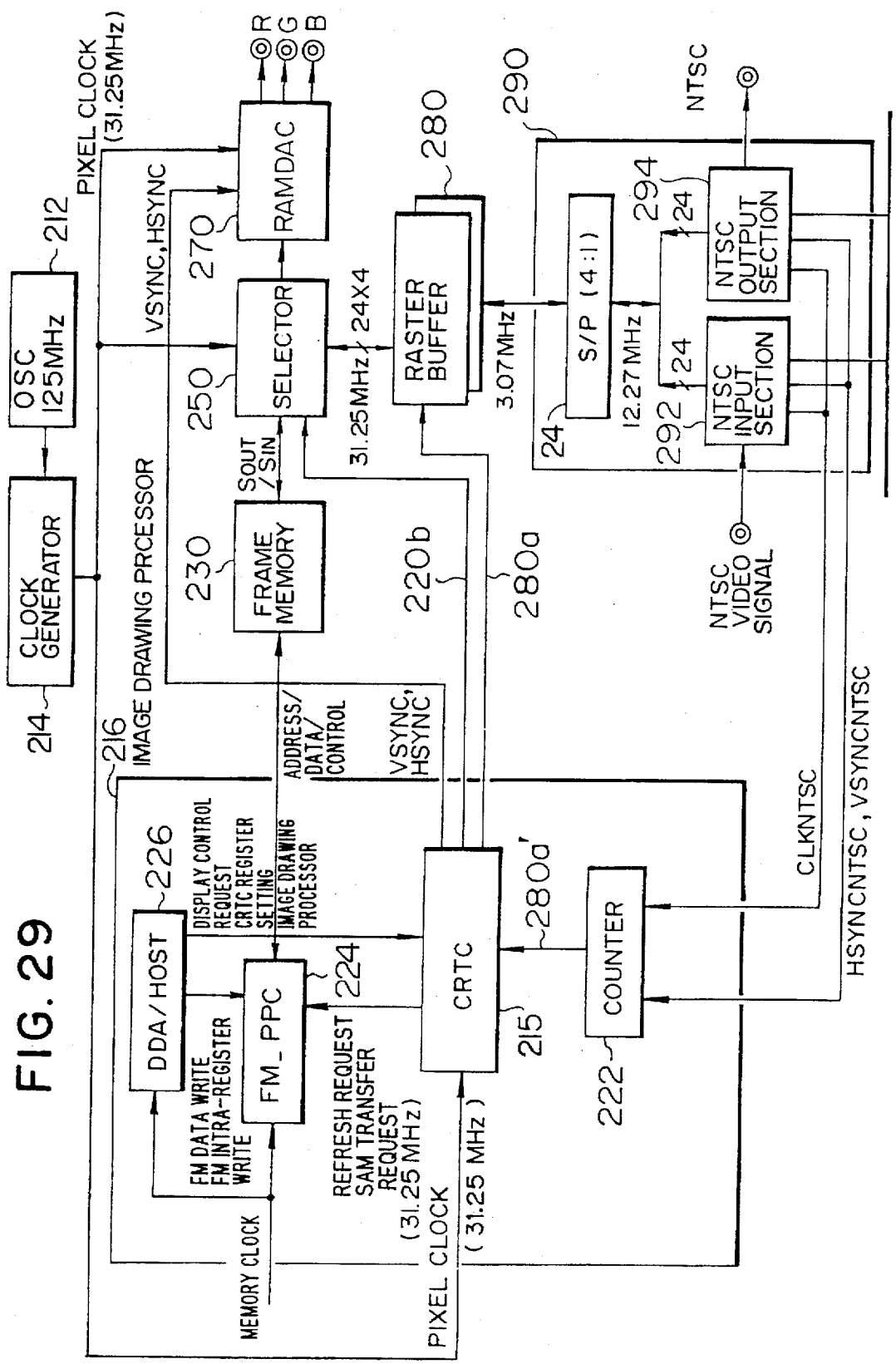
FIG. 29 is a block diagram showing in detail the second embodiment according to the present invention.

FIG. 29 shows in a detailed block diagram the constitution of the second embodiment according to the present invention. The primary configuration of this system is the same as the structure of FIG. 18.

The construction includes a frame memory 230, a selector 250, a video signal interface 270 of a first video signal, a raster buffer 280 of a second video signal, a video signal interface 290 for the second video signal, an NTSC input section 292, an NTSC output section 294, a serial/parallel converter 24 for converting, when the NTSC input section 292 is selected, a serial signal into a parallel signal and converting, when the NTSC output section 294 is selected, a parallel signal into a serial signal, an oscillator 212 for generating a clock signal denoting a sampling frequency of the first video signal, a clock generator 214 for shaping a waveform of a signal output from the oscillator 212, an image drawing processor 216 for achieving a control operation to write a computer graphic image in the frame memory 230 so as to output the image as a first video signal and to write the second video signal in the frame memory 230, a CRTC 215 having functions respectively of the time indicating section 210 and the time-sharing controller 220 of FIG. 18, a frame memory synchronization controller (FM-PPC) 224 for outputting addresses and data to the frame memory 230 to control read and write operations, a drawing controller (DDA/HOST) 226 for generating image data of computer graphics and for setting internal registers of the CRTC 215, a counter 222 for receiving as an input thereto a synchronizing signal of the NTSC video signal to concurrently produce the state of the raster buffer 280 in the image drawing processor 216.

The interface 290 for the second video signal can be used for the NTSC video signal input and output operations. Namely, this section 290 includes the NTSC input section 292 and the NTSC output section 294 such that a change-over operation is conducted therebetween when necessary.

In a case where the state that raster data has been stored in the raster buffer is confirmed on the basis of the state of the buffer 280, the state being reproduced by the counter 222 in the system, the raster transfer request is sent via the line 280a to the CRTC 215. The CRTC 215 determines, according to the reference clock signal of the first video signal supplied thereto, the horizontal blanking period and the horizontal effective period. On receiving the raster transfer request, the CRTC 215 decides a horizontal blanking period in which the raster of the second video signal can be transferred to report an answer via the line 280a to the raster buffer 280.

The image drawing processor 216 operates in an operation mode denoted by a processor 240, not shown. Information specified for the mode includes an indication for selection of the NTSC input section 292 or the NTSC output section 294, a transfer data amount of a raster or half thereof to be sent through each raster transfer, and a position and a size of the NTSC video signal in the frame memory 230.

Figure 30:
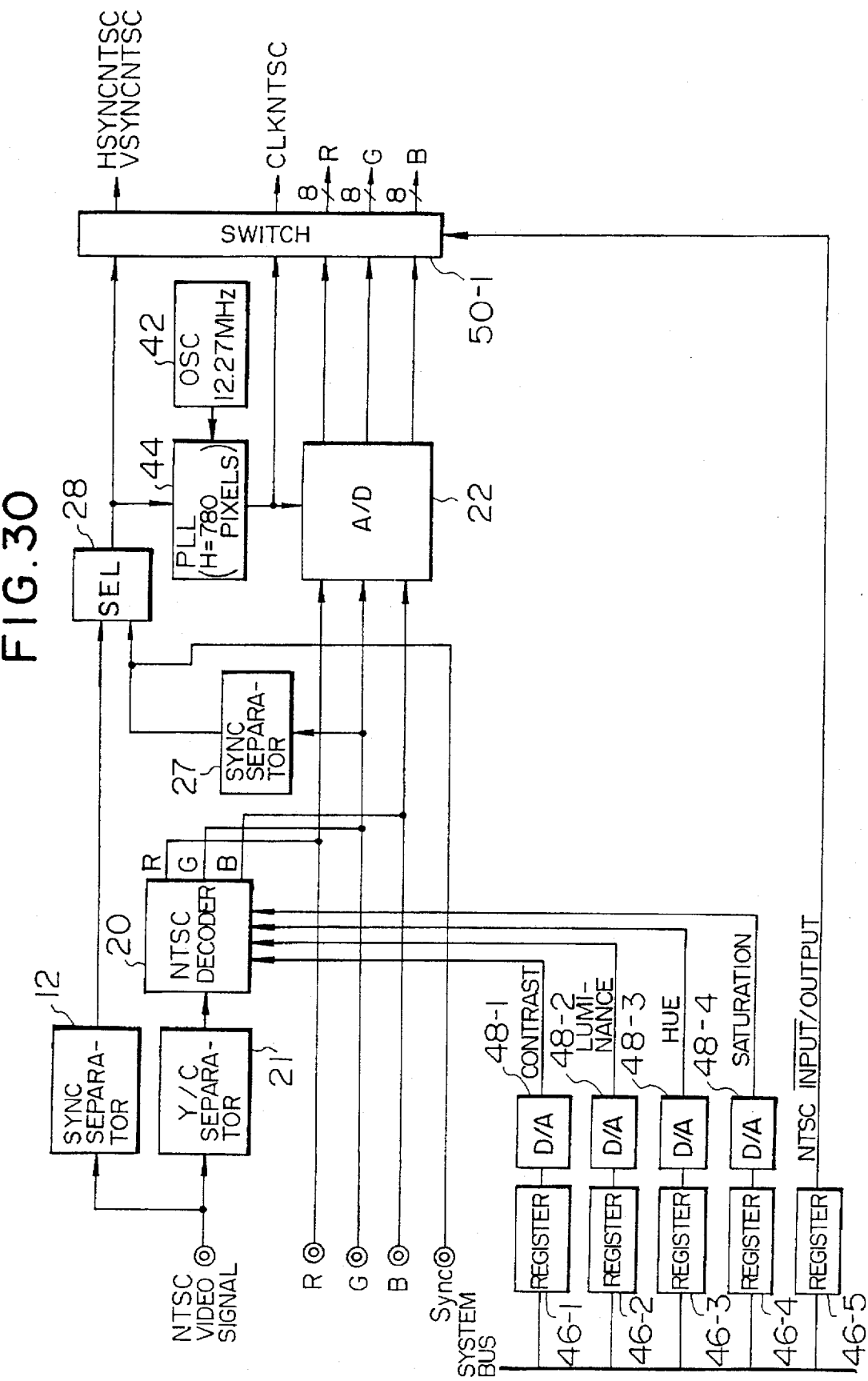
FIG. 30 is a detailed block diagram showing the signal input section for receiving the NTSC video signal.

FIG. 30 is a block diagram showing in detail the structure of the input section for receiving an input thereto the NTSC video signal. The fundamental configuration is the same as the construction of FIG. 19.

The system of FIG. 30 includes a Y/C separator 21 for separating an input NTSC video signal into a luminance signal Y and a color difference signal C, an NTSC decoder 20 for converting the luminance signal Y and the color difference signal C into an RGB signal, an analog/digital converter (A/D) 22 for digitizing the RGB signal, an oscillator 42 for creating a clock signal designating a sampling frequency of the A/D converter 22, a phase-locked loop (PLL) 44 for matching the phase of the clock signal with the synchronizing signal of the input NTSC video signal or the RGB signal, a synchronizing signal separator 12 for separating multiplexed synchronizing signals from the NTSC video signal, a synchronizing signal separator 27 for separating, when the RGB signal is input in place of the NTSC video signal, multiplexed synchronizing signals from the green (G) signal, a selector 28 for selecting a synchronizing signal output from the synchronizing signal separator 12 or 27, registers 46-1 to 46-4 for storing therein, in the form of a digital value, the value of signals to adjust the NTSC decoder 20, a register 46-5 for indicating a selection of the NTSC input section 292 or the NTSC output section 294, digital/analog converters D/As 48-1 to 48-4 for converting adjusting values indicated by the registers 46-1 to 46-4 for the NTSC decoder 20 into analog signals, and a switch 50-1 for receiving an indication from the register 46-5 to select the NTSC input section 292 or the NTSC output section 294.

FIG. 31 is a block diagram showing details of the output section for producing the NTSC video signal. The basic structure is the same as the constitution of FIG. 20, which is used to explain the video signal interface 270. In contrast thereto, the NTSC output section of FIG. 31 is a constituent element of the video signal interface 290 and hence even the same constituent elements as those of FIG. 20 are assigned with different reference numerals.

The configuration includes a digital/analog converter (D/A) 52 for converting the digitized RGB signal into an analog signal, an NTSC encoder 54 for transforming the analog RGB signal into an NTSC video signal, an oscillator 56 for generating a clock signal denoting an operation frequency of the NTSC encoder 54, an oscillator 57 for creating a sampling frequency of the digital RGB video signal, a clock generator 58 for shaping a waveform of a signal output from the oscillator 57, a horizontal and vertical synchronizing signal generator 59, a register 46-6 for temporarily storing therein data to be registered to the D/A 52, a register 46-7 for designating selection of the NTSC input section 292 or the NTSC output section 294, and switches 50-2 and 50-3 for achieving a selection in response to an indication from the register 46-7.

In the embodiment, although the first video signal is processed without using a buffer, there may be employed a buffer like in the case of the second video signal. Use of the buffer facilitates the timing adjustment.

Next, description will be given of a third embodiment according to the present invention. In this embodiment, a time indicator denotes the raster transfer period with the number of rasters per unit time, the number being greater than the total number of rasters per unit time of the first video signal and that of rasters per unit time of the second video signal. With this provision, for all rasters of the first and second video signals, respectively, there can be guaranteed a period of time for accessing the frame memory.

Moreover, the rasters of the respective first and second video signals are generated in an asynchronous manner. However, the time-sharing controller allocates, on receiving an access request of a raster of the first video signal, a raster transfer period to the first video signal and assigns, on receiving an access request of a raster of the second video signal, a raster transfer period to the second video signal.

As a result, even when the rasters of the first and second video signals are not synchronous with each other, the raster transfer period can be allocated to each raster.

Furthermore, even when access requests of the first and second video signals, respectively, are simultaneously issued and there occurs a conflict therebetween, the time-sharing controller can execute a control operation to set one of the access requests in a wait state such that the frame memory is sequentially accessed to process the first and second video signals, thereby removing the conflict. Next, the third embodiment will be described in detail.

Figure 22:
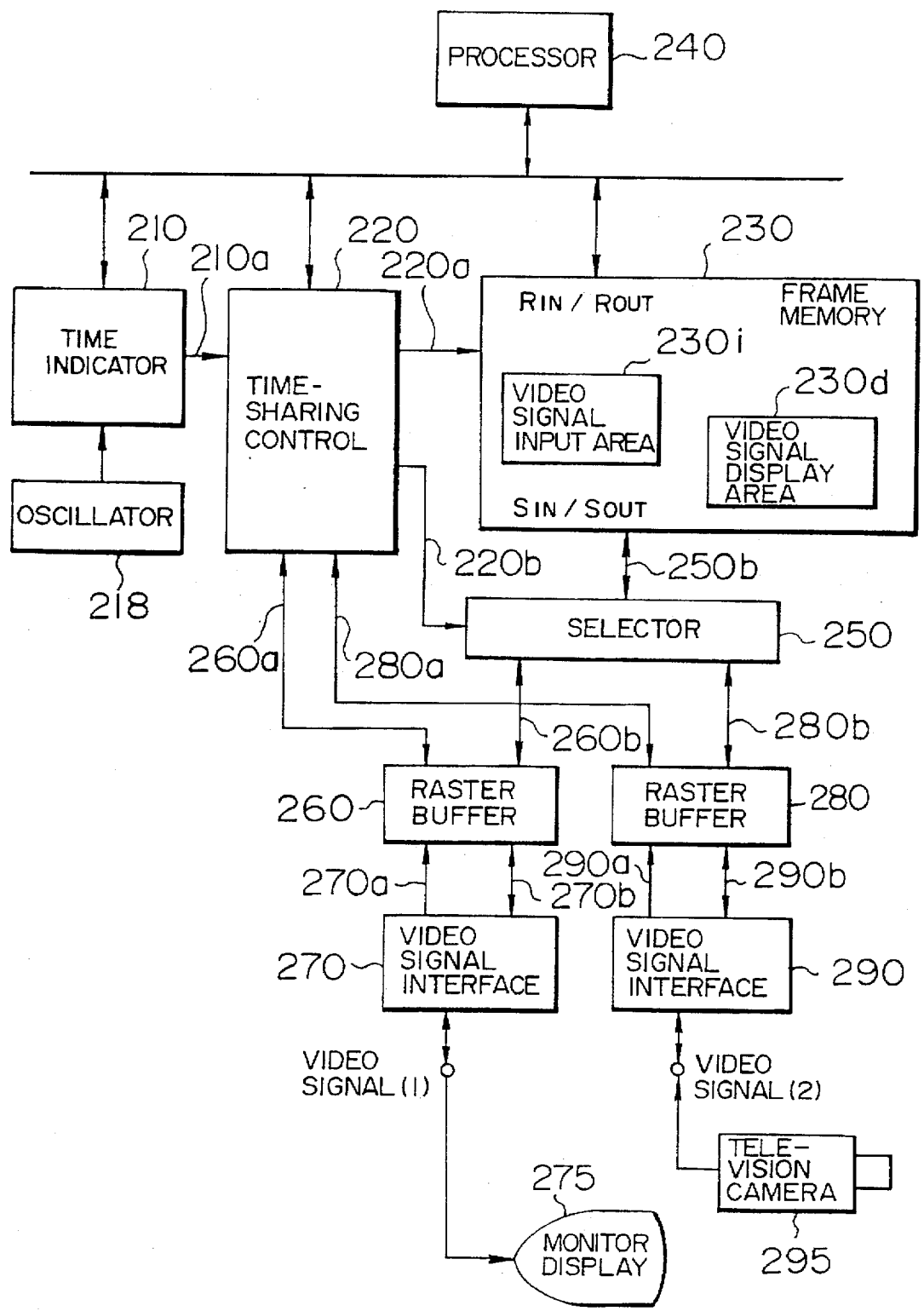
FIG. 22 is a block diagram showing a third embodiment according to the present invention.

FIG. 22 is a block diagram showing the constitution of the third embodiment according to the present invention. The system is constructed in substantially the same configuration as that shown in FIG. 18. The difference in the structure resides in that in place of supplying the synchronizing signal 270a from the video signal interface 270 to the time indicator 210 and the time-sharing controller 220, there are adopted an oscillator 218. Moreover, a raster buffer 260 of the first video signal is arranged.

The time indicating section 210 receives a clock signal from the oscillator 218 to create a raster data transfer period for inputting or outputting raster data of the video signal to or from the frame memory. The number of raster data transfer periods per unit time is required to be larger than a total number of rasters respectively of first and second video signals per unit time.

The time-sharing controller 220 receives a raster transfer request from a raster buffer 260, which will be described later, via a signal line 260a and a raster transfer request from a raster buffer 280, which will be described later, via a signal line 280a to allocate a raster data transfer period to the raster buffer having issued the request. A result of allocation is reported via the line 260a or 280a to the pertinent raster buffer. Moreover, a control signal is sent via a line 220a to the frame memory 230 to simultaneously instruct a selector 250 via a signal line 220b to select either one of the raster buffers for connection to the frame memory 230.

Included in the system is a processor 240 for controlling the time indicator 210 and the time-sharing controller 220 and processing the raster data stored in the frame memory 230.

The raster buffers 260 and 280 as well as the video signal interface sections 270 and 290 can be set for the input and output operations.

When the raster buffer 260 and the video signal interface 270 for the first video signal are to be used for an output operation, the raster data stored in the raster buffer 260 is delivered via a signal line 270b to the interface 270 to be combined with a horizontal synchronizing signal generated in the interface 270, thereby outputting the result as a video signal to a monitor display 275. The raster buffer 260 sends, when a raster of data is completely output therefrom, a raster data transfer request onto the line 260a. On receiving as a response thereto acknowledgment of transfer via the line 260a, a raster of data loaded in a video display area 230d of the frame memory 230 is delivered therefrom to the raster buffer 260 via a line 250b, the selector 250, and the line 260b.

On the other hand, when the raster buffer 280 and the video signal interface 290 for the second video signal are to be used for an input operation, the second video signal output from a television camera 295 is separated by the video signal interface 290 into a synchronizing signal 290a and raster data 290b to be provisionally stored in the raster buffer 280. When the data is thus stored, the raster buffer 280 sends a raster data transfer request to the line 280a. Upon receiving, as an answer thereto, allowance of transfer via the line 280, the raster buffer 280 writes a raster in the video display area 230i of the frame memory 230 via the line 280b, the selector 250, and the line 250b.

Figure 23:
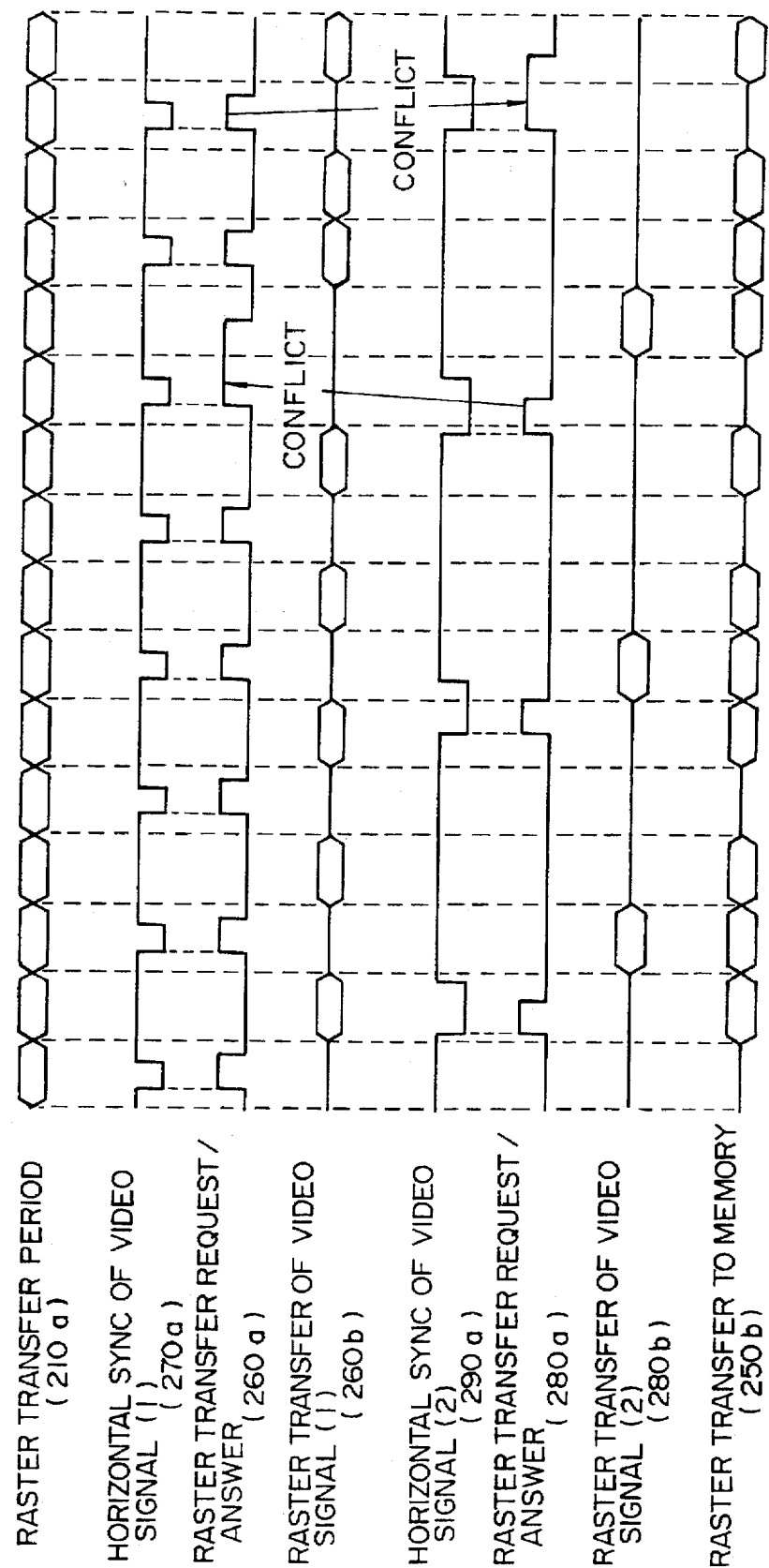
FIG. 23 is a signal timing chart for explaining the basic operation of the third embodiment.

FIG. 23 is a signal timing chart useful to explain the basic operation of the third embodiment according to the present invention.

It is necessary to set the number of raster data transfer periods per unit time to be larger than a total of the numbers of rasters respectively of first and second video signals per unit time.

When the raster buffer 260 and the video signal interface 270 for the first video signal are set for an output operation, the raster buffer 260 delivers a raster of data to the interface 270. At completion of the output operation, namely, when the next horizontal synchronizing signal is established, the buffer 260 outputs a raster data transfer request to the line 260a. In the diagram, the request is indicated by a rising edge of the raster data transfer request/answer signal, When the time-sharing controller 220 allocates a raster data transfer period, acknowledgment of transfer is notified as a response thereto via the line 260a to the raster buffer 260. In the diagram, the response is indicated by the falling edge of the raster data transfer request/answer signal. The raster buffer 260 then receives a raster of data from the frame memory 230 via the line 260b.

On the other hand, when the raster buffers 280 and the video signal interface 290 for the second video signal are to be used for an input operation, a raster of data is delivered from the interface 290 to be stored in the raster buffer 280. When the data is completely stored, namely, when the next horizontal synchronizing signal is established, the raster buffer 280 sends a raster data transfer request to the line 280a. In the diagram, the request is designated by the rising edge of the raster data transfer request/answer signal. When the controller 220 allocates a raster data transfer period, allowance of transfer is reported as a response thereto via the line 280a to the buffer 280. In the diagram, the response is indicated by the falling edge of the raster data transfer request/answer signal. The raster buffer 280 then transfers a raster of data via the line 280b to the frame memory 230.

The transfer of raster data via the line 250b directly connected to the frame memory 230 is implemented as raster data transfers achieved via the lines 260b and 280b, respectively.

When a plurality of raster data transfer requests occur during a transfer period and hence there results conflict therebetween, the time-sharing controller 220 allocates the raster data transfer period to the first one of the raster buffers and the subsequent period to the second one thereof. Priority of allocation of the transfer period may be arbitrarily determined. For example, the period may be assigned in accordance with the receiving order of the transfer request.

Figure 24:
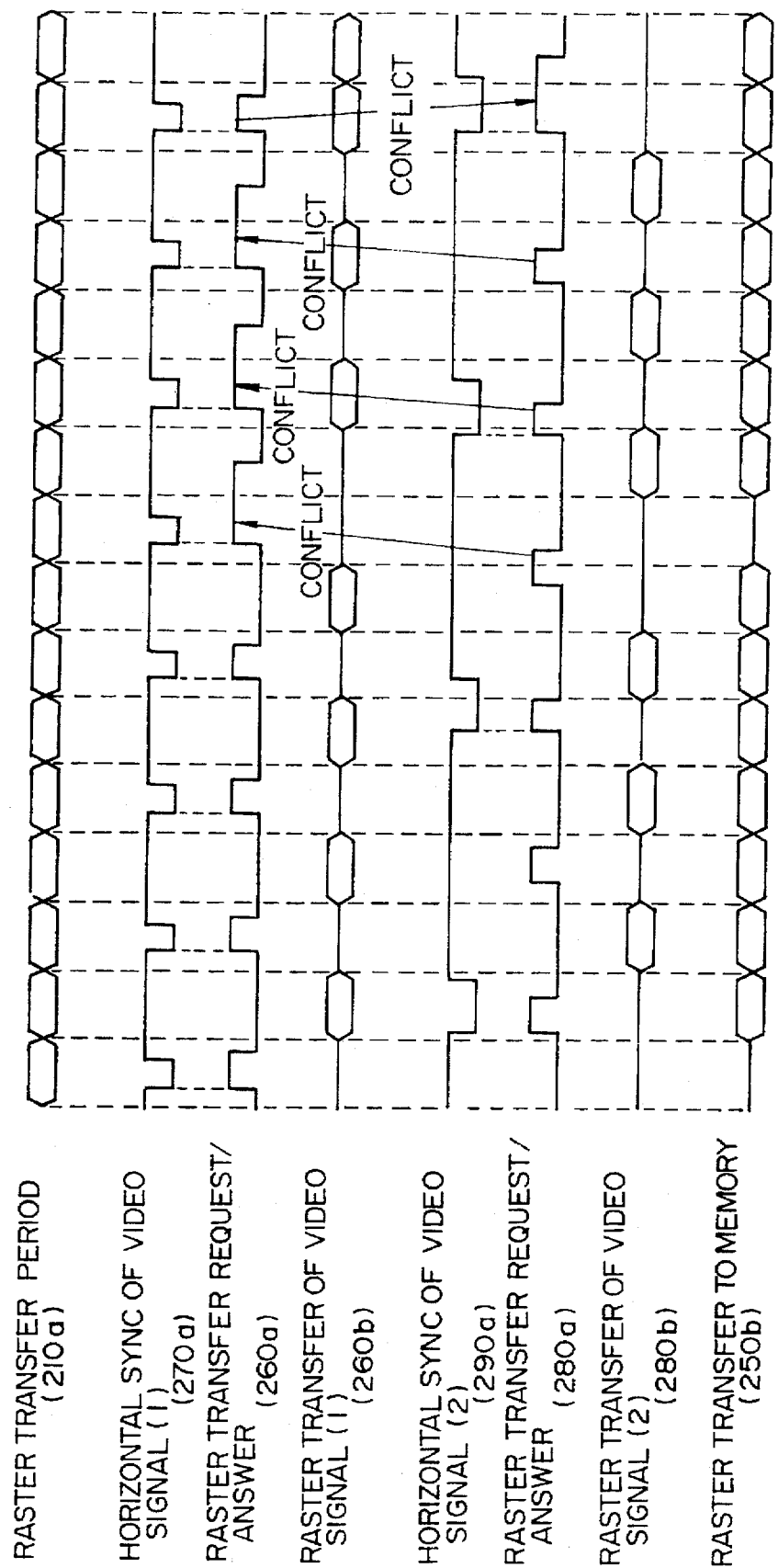
FIG. 24 is a signal timing chart for explaining operations related to the basic operation of the third embodiment.

FIG. 24 is a signal timing chart for explaining operations derived from the basic operation of the third embodiment according to the present invention.

In the description above, a raster of data is transferred in each raster data transfer period; however, the quantity of data to be transferred need not be necessarily limited to a raster of data. In FIG. 24, data equivalent to one raster of the second video signal is partitioned into two subordinate data items. The number of raster data transfer periods per unit time is set to be larger than a total of the number of rasters of the first video signal per unit time and a value attained by multiplying by two the number of rasters of the second video signal per unit. Processing procedures other than those above are the same as those of the flowchart of FIG. 23. With the provision, raster data of video signals can be transferred via a plurality of channels to a single frame memory.

When a raster contains a large number of pixels and cannot be completely transferred in a raster data transfer period, it is quite efficient to adopt this method of subdividing the raster data into several subordinate data items for the transfer.

Figure 25:
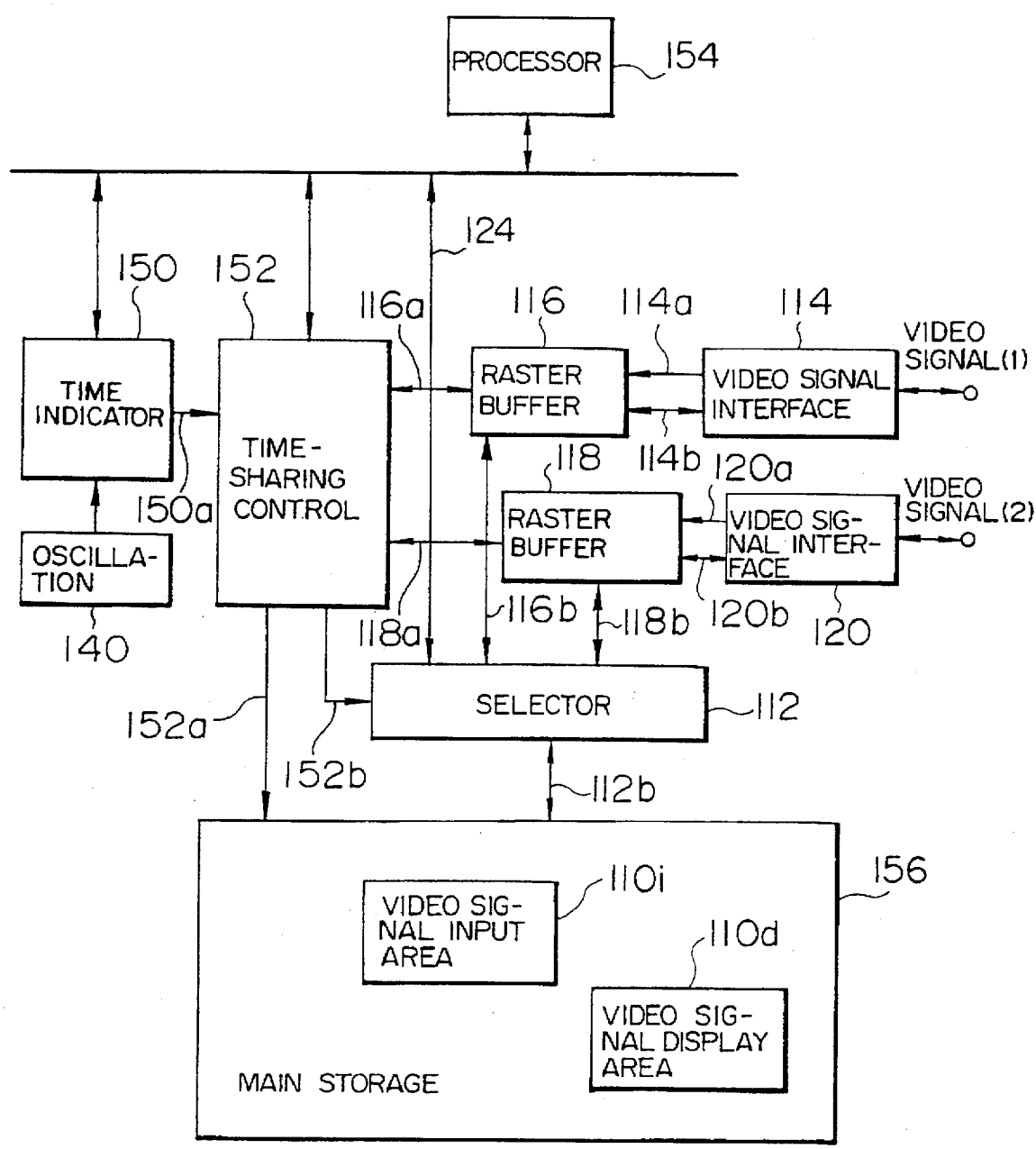
FIG. 25 is a block diagram showing a fourth embodiment according to the present invention.

FIG. 25 shows in a block diagram the structure of a fourth embodiment according to the present invention. The configuration includes an oscillator 140, a time indicating section 150, a time-sharing controller 152, a processor 154, a main storage 156, a selector 112, a raster buffer 116 of a first video signal, a video signal interface 114 for the first video signal, a raster buffer 118 of a second video signal, and a video signal interface 120 for the second video signal.

In this embodiment, a memory used as the main memory area by the processor 154 and a frame memory for storing therein video signals are physically integrated as a main storage 156.

The time indicator 150 receives a clock signal from the oscillator 140 to produce a raster data transfer period for inputting or outputting a raster of video signals in or from the frame memory.

The time-sharing controller 152 receives a raster transfer request from a raster buffer 116, which will be described later, via a line 116a and a raster transfer request from a raster buffer 118, which will be described later, via a line 118a, thereby distributing the transfer period to the raster buffer having sent the request. A result of distribution is notified via the line 116a or 118a to the pertinent raster buffer. Moreover, a control signal is delivered via a line 152a to the main storage 110 and an instruction is sent at the same time via a line 152b to the selector 112 for selection of the raster buffer 116, the raster buffer 118, or the processor 154.

The processor 154 controls the time indicator 150 and the time-sharing controller 152 and processes data including the raster data stored in the main memory 156.

The raster buffers 116 and 118 and the video signal interface sections 114 and 120 can be set for the input and output operations.

When the buffer 116 and interface 114 related to the first video signal are set for an output operation, the raster data stored in the buffer 116 is outputted via a signal line 114b to the interface 144 and is combined with a horizontal synchronizing signal created in the interface 114 so as to output a video signal. The raster buffer 116 sends, when a raster of data is completely output therefrom, a raster data transfer request to the line 116a. On receiving via the line 116a acknowledgment of transfer as a response thereto, the next data equivalent to one raster is input thereto from a video display area 110d of the main storage 110 via a line 112b, the selector 112, and a line 116b.

On the other hand, when the raster buffer 118 and the interface 120 associated with the second video signal are used for an input operation, the second video signal input thereto is separated by the interface 120 into a synchronizing signal 120a and raster data 120b to be temporarily stored in the buffer 118. At termination of the data storage, the buffer 118 delivers a raster data transfer request to a line 118a. When allowance of transfer is received via the line 118a as an answer thereto, a raster of data is transmitted from the buffer 118 to a video input area 110i of the main memory 110 via a signal line 118b, the selector 112, and the line 112b.

As described above, the operation of this embodiment is substantially identical to that of the second embodiment shown in FIG. 18. However, the memory section of this embodiment is the main storage for storing video signals as well as data to be handled by the processor 154. Consequently, to guarantee a satisfactory throughput of accesses from the processor 154 to the main storage 156, the number of raster data transfer periods per unit time is required to be set as follows. Namely, there are added a certain period of time to the total of the number of rasters respectively of first and second video signals per unit time.

Figure 26:
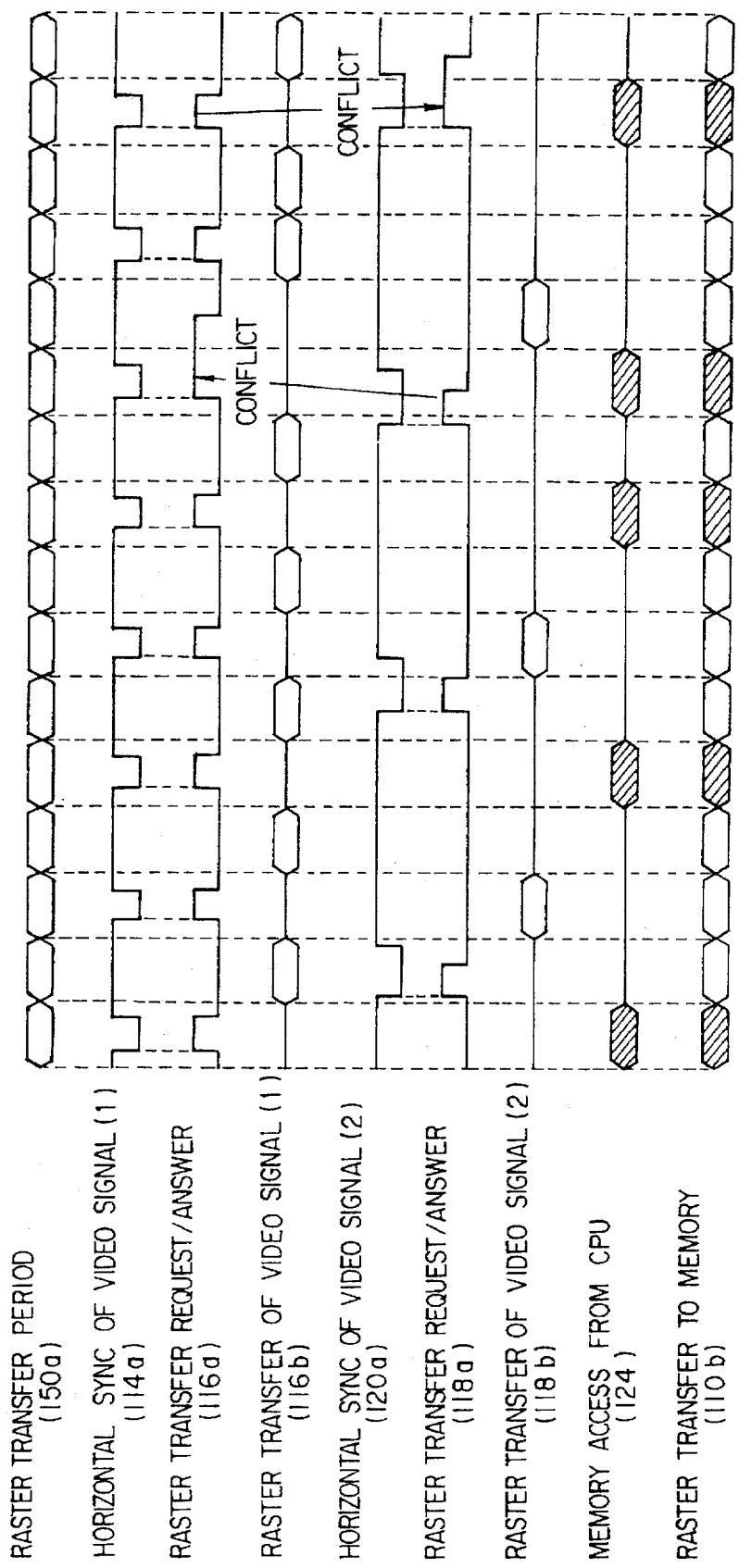
FIG. 26 is a signal timing chart for explaining the operation of the fourth embodiment.
Figure 27:
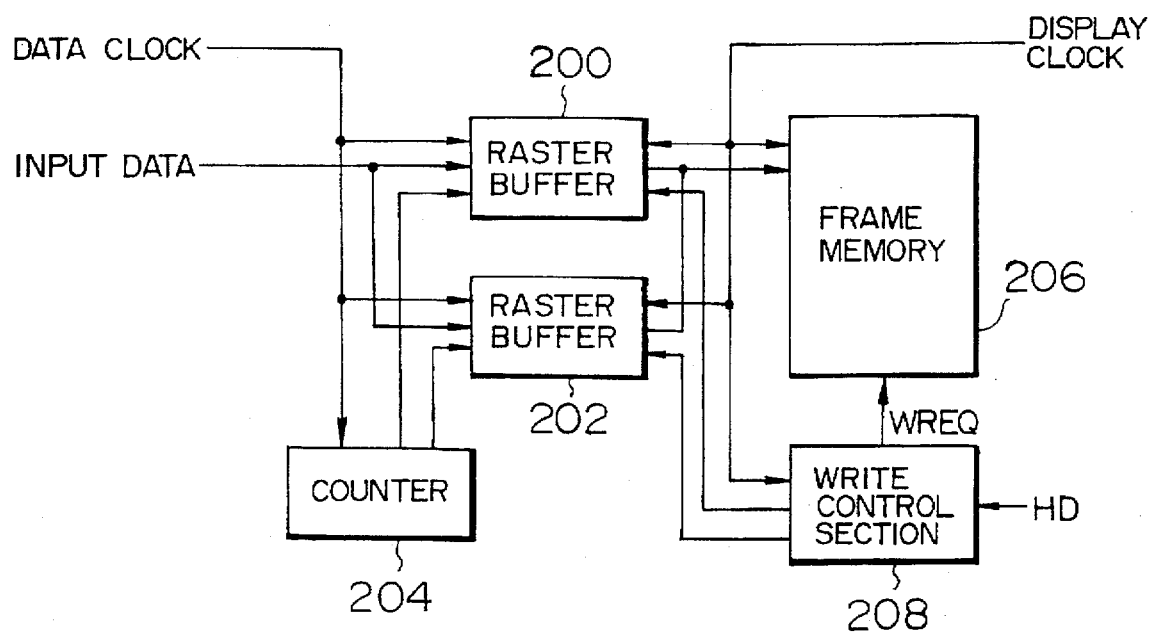
FIG. 27 is a block diagram showing a conventional example.
Figure 28:
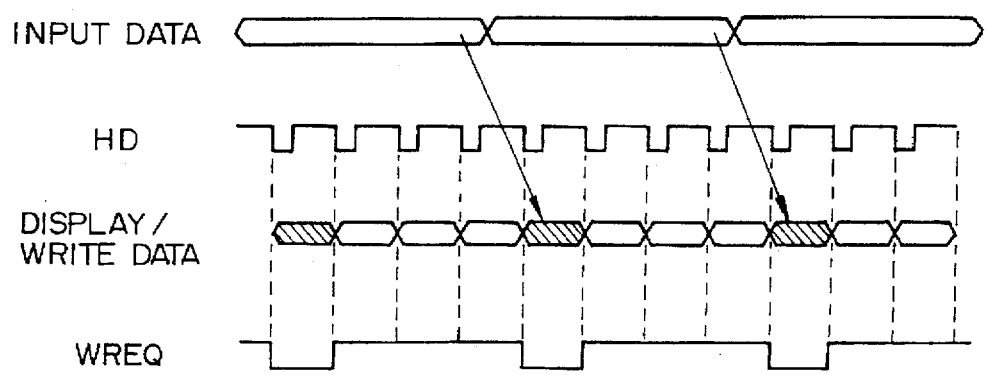
FIG. 28 is a signal timing chart for explaining the operation of the conventional example.

FIG. 26 is a signal timing chart useful to explain the operation of the fourth embodiment according to the present invention.

The contents of this chart are almost the same as those of the second embodiment shown in FIG. 21. The difference resides however in that during the period to transfer raster data to the memory as indicated by the line 112b in FIG. 25, a period thereof in which raster data of video signals is not achieved is used by the CPU to access the memory.

As above, according to the present invention, there is adopted a time-sharing access control method in which the total access time of the frame memory is distributed to video signals of two or more channels. Moreover, such video signals include synchronizing signals different from each other and hence there has been devised a frame memory access method in consideration of the asynchronous characteristic thereof.

With the provision of the present invention, the contents of a single frame memory can be output therefrom as video signals of two channels associated with the different synchronizing signals. Consequently, while visually checking a display screen image of a workstation presenting highly fine video signals, the operator can activate a video deck to record on a video tape NTSC video signals simultaneously output.

Moreover, while the contents of the single frame memory is being output as a display image, it is possible to store in the frame memory the video signals inputted from a television camera or the like. Namely, for example, after achieving a super-imposing operation in which the stored video signals are imposed onto image data and/or a composing operation in which a video window is established in image data, the contents stored in the memory can be outputted as a display image.

The present invention is also applicable to a workstation which can be used in a multi-media presentation system and a remote electronic conference.

According to the embodiments of the present invention as described above, there can be provided an image input/output apparatus in which video signals of two or more channels associated with different synchronizing signals can be input or output in or from a single frame memory at the same time.

While particular embodiments of the invention have been shown and described, it will be obvious to those skilled in the art that various changes and modifications may be made without departing from the present invention in its broader aspects.

We claim:

1. An image input/output apparatus for inputting therein and outputting therefrom a first video signal and a second video signal, comprising:

a frame memory for storing therein first data and second data which are respectively contained in the first and second video signals, wherein said first and second video signals have different frequencies from each other;

a first buffer for communicating and storing therein the first data;

a second buffer for communicating and storing therein the second data;

time indicating means for outputting a timing signal as a reference of a transfer period in which communications are achieved between the frame memory and each of the first and second buffers; and a time-sharing control means, operative in response to reception of a request from either one of the first and second buffers for a transfer period for communication between the frame memory and the buffers, for outputting transfer acknowledgement to either one of the buffers, thereby allocating a period indicated by the time indicating means as the transfer period respectively of the first data and the second data, the first and second buffers respectively issuing the allocation requests of the transfer period of the first data and the second data to the time-sharing control means and achieving, when the transfer period is thus allocated, communications respectively of the first and second data with the frame memory.

2. An image input/output apparatus according to claim 1, further including an oscillator for supplying a clock signal to said time indicating means, said clock signal being used by said time indicating means to create a data transfer period for inputting or outputting the first and second data of the first and second video signals, respectively, to or from said frame memory.

3. An image input/output apparatus according to claim 2, wherein a number of data transfer periods per unit time must be larger than a total number of rasters of the first and second video signals per unit time, respectively.

* * * * *